US011973263B2

(12) United States Patent
Seo et al.

(10) Patent No.: US 11,973,263 B2
(45) Date of Patent: Apr. 30, 2024

(54) ANTENNA AND ELECTRONIC DEVICE COMPRISING SAME

(71) Applicant: Samsung Electronics Co., Ltd., Gyeonggi-do (KR)

(72) Inventors: Mincheol Seo, Gyeonggi-do (KR); Donghun Shin, Gyeonggi-do (KR); Yonghyun Yoon, Gyeonggi-do (KR); Gyusub Kim, Gyeonggi-do (KR); Seongjin Park, Gyeonggi-do (KR); Myunghun Jeong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 17/839,671

(22) Filed: Jun. 14, 2022

(65) Prior Publication Data
US 2022/0311128 A1    Sep. 29, 2022

Related U.S. Application Data

(63) Continuation of application No. PCT/KR2020/013530, filed on Oct. 6, 2020.

(30) Foreign Application Priority Data

Dec. 20, 2019  (KR) .......................... 10-2019-0172324

(51) Int. Cl.
*H01Q 1/24*    (2006.01)
*H01Q 1/38*    (2006.01)
(Continued)

(52) U.S. Cl.
CPC .............. *H01Q 1/243* (2013.01); *H01Q 1/38* (2013.01); *H01Q 1/526* (2013.01); *H01Q 5/307* (2015.01); *H01Q 5/378* (2015.01); *H01Q 19/22* (2013.01)

(58) Field of Classification Search
CPC .......... H01Q 1/243; H01Q 1/38; H01Q 1/526; H01Q 5/307; H01Q 5/378; H01Q 19/22
See application file for complete search history.

(56) References Cited

U.S. PATENT DOCUMENTS 10,826,159 B2 * 11/2020 Kim ................. B29C 45/14655
10,992,028 B2 *  4/2021 Moon .................... G06F 1/1656
(Continued)

FOREIGN PATENT DOCUMENTS

KR   10-2017-0025846 A   3/2017
KR   10-2018-0021432 A   3/2018
(Continued)

OTHER PUBLICATIONS

Korean Office Action dated Jan. 3, 2024.

*Primary Examiner* — A B Salam Alkassim, Jr.
*Assistant Examiner* — Leah Rosenberg
(74) *Attorney, Agent, or Firm* — Cha & Reiter, LLC

(57) ABSTRACT

An electronic device according to a certain embodiments comprises: a housing including a front plate, a rear plate, and a side member surrounding a space between the front plate and the rear plate; an antenna module disposed in the space, and configured to transmit and receive first signals belonging to a first frequency band using at least one antenna element; a nonconductive member disposed to face at least one surface of the antenna module; and a conductive pattern being closer to the rear plate than to the at front plate and disposed between the nonconductive member and the rear plate, wherein the conductive pattern is configured to: change a radiation direction of at least a portion of the first signal and transmit and receive a second signal belonging to a second frequency band.

20 Claims, 25 Drawing Sheets

(51) Int. Cl.
  *H01Q 1/52* (2006.01)
  *H01Q 5/307* (2015.01)
  *H01Q 5/378* (2015.01)
  *H01Q 19/22* (2006.01)

(56) References Cited

U.S. PATENT DOCUMENTS

| | | | |
|---|---|---|---|
| 11,139,565 B2* | 10/2021 | Jeon | H01Q 21/08 |
| 11,159,659 B2 | 10/2021 | Khripkov | |
| 11,239,562 B2* | 2/2022 | Jia | H01Q 9/0464 |
| 11,757,174 B2 | 9/2023 | Lee et al. | |
| 2017/0373374 A1 | 12/2017 | Moon et al. | |
| 2018/0151947 A1 | 5/2018 | Apostolos et al. | |
| 2018/0331418 A1 | 11/2018 | Kim et al. | |
| 2019/0214706 A1 | 7/2019 | Kim et al. | |
| 2020/0014093 A1 | 1/2020 | Kim et al. | |
| 2021/0242572 A1 | 8/2021 | Moon et al. | |
| 2022/0102845 A1 | 3/2022 | Seo et al. | |
| 2022/0181793 A1* | 6/2022 | Zhang | H01Q 1/243 |
| 2022/0224021 A1* | 7/2022 | Song | H01Q 21/08 |
| 2023/0104268 A1* | 4/2023 | Do | H01Q 1/2225 |
| | | | 343/702 |
| 2023/0178899 A1* | 6/2023 | Cai | H01Q 21/0075 |
| | | | 343/721 |
| 2023/0420829 A1 | 12/2023 | Lee et al. | |

FOREIGN PATENT DOCUMENTS

| | | |
|---|---|---|
| KR | 10-2018-0124621 A | 11/2018 |
| KR | 10-2018-0134528 A | 12/2018 |
| KR | 10-2019-0061161 A | 6/2019 |
| KR | 10-2019-0090870 A | 8/2019 |
| KR | 10-2020-0101172 A | 8/2020 |
| KR | 10-2020-0142905 A | 12/2020 |
| KR | 10-2021-0001709 A | 1/2021 |
| WO | 2019/120515 A1 | 6/2019 |

* cited by examiner

ANTENNA AND ELECTRONIC DEVICE COMPRISING SAME

CROSS REFERENCE TO RELATED APPLICATION(S)

This application is a Continuation of and based on and claims priority under 35 U.S.C. 120 to PCT Application No. PCT/KR2020/013530, filed Oct. 6, 2020 (and published as WO/2021/125518) that in turn claims priority to Korean Patent Application No. 10-2019-0172324, filed on Dec. 20, 2019, in the Korean Intellectual Property Office, the disclosure of which is incorporated herein by reference in its entirety.

BACKGROUND

Technical Field

Certain embodiments disclosed in the disclosure relate to an antenna and an electronic device including the same.

Description of Related Art

An electronic device may transmit and/or receive a radio frequency (RF) signal representing a voice signal or data (e.g., a message, a picture, a video, a music file, or a game) by using an antenna.

The antenna may simultaneously transmit and receive signals belonging to different frequency bands. The electronic device may service a global communication band by using signals belonging to different frequency bands. For example, the electronic device may perform communication (e.g., a global positioning system (GPS), Legacy, and Wifi1) that uses signals belonging to a low frequency band (LB), and/or communication (e.g., Wifi2) that uses signals belonging to a high frequency band (HB).

As a next-generation (e.g., a fifth generation, 5G) communication is introduced, the electronic device may support new frequency bands, such as millimeter wave (mmWave) and/or sub6 (e.g., n78 and n79). The electronic device may include an antenna for supporting new frequency bands.

The placement of the antenna presents a number of issues. Generally speaking, the front surface has very little room because of the display, and front facing cameras. It also may not be easy to place an antenna in the interior of the electronic device due to the amount of space.

To allow the electronic device to support new frequency bands, when the number of radiators included in the electronic device may increase but a space of the electronic device decrease, a radiation performance of the antenna may decrease.

Certain embodiments disclosed in the disclosure provide an electronic device that may increase radiation performance while including antennas of various bands.

SUMMARY

An electronic device according to a certain embodiments comprises: a housing including a front plate, a rear plate, and a side member surrounding a space between the front plate and the rear plate; an antenna module disposed in the space, and configured to transmit and receive first signals belonging to a first frequency band using at least one antenna element; a nonconductive member disposed to face at least one surface of the antenna module; and a conductive pattern being closer to the rear plate than to the at front plate and disposed between the nonconductive member and the rear plate, wherein the conductive pattern is configured to: change a radiation direction of at least a portion of the first signal and transmit and receive a second signal belonging to a second frequency band.

An electronic device according to certain embodiments may include a housing including a front plate facing a first direction, a rear plate facing a second direction that is an opposite direction to the first direction, and a side member surrounding a space between the front plate and the rear plate, and connecting one side of the front plate and one side of the rear plate, a nonconductive member disposed in the space, an antenna module disposed in the second direction of the nonconductive member, and a conductive pattern disposed in an FPCB and/or an LDS to be at least partially adjacent to the antenna module, the conductive pattern may change a first radiation pattern that is a radiation pattern of a first signal belonging to a first frequency band of about 25 GHz to about 100 GHz in a third direction that is perpendicular to the first direction and the second direction, and the conductive pattern may be connected to the antenna module through a feeder to form a second radiation pattern that is a radiation pattern of a second signal belonging to a second frequency band of about 3.5 GHz to about 6 GHz.

BRIEF DESCRIPTION OF THE DRAWINGS

With regard to description of drawings, the same or similar components may be marked by the same or similar reference numerals.

DETAILED DESCRIPTION

Hereinafter, certain embodiments of the disclosure will be described with reference to the accompanying drawings. Accordingly, those of ordinary skill in the art will recognize that modification, equivalent, and/or alternative on the certain embodiments described herein can be variously made without departing from the scope and spirit of the disclosure.

According to embodiments disclosed in the disclosure, a conductive pattern is disposed on a nonconductive member to be used as a radiator, thereby allowing a larger number of antennas to be disposed on the electronic device.

According to embodiments disclosed in the disclosure, the electronic device may change a radiation form of a 5G high-frequency band by using the conductive pattern that radiates a 5G sub6 frequency band.

In addition, the disclosure may provide various effects that are directly or indirectly recognized.

Figure 1:
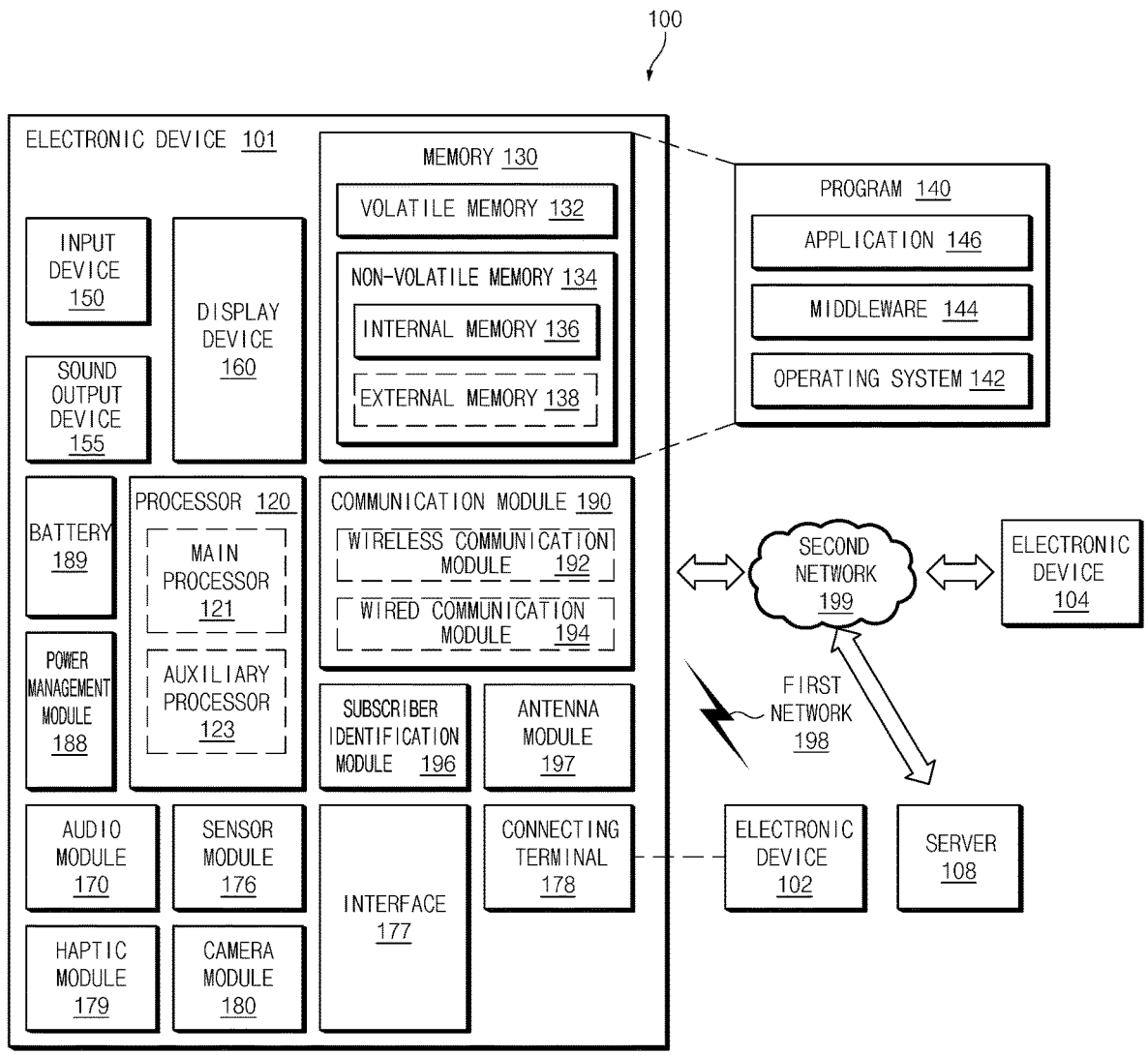
FIG. 1 is a block diagram illustrating an electronic device in a network environment according to certain embodiments.
Figure 2:
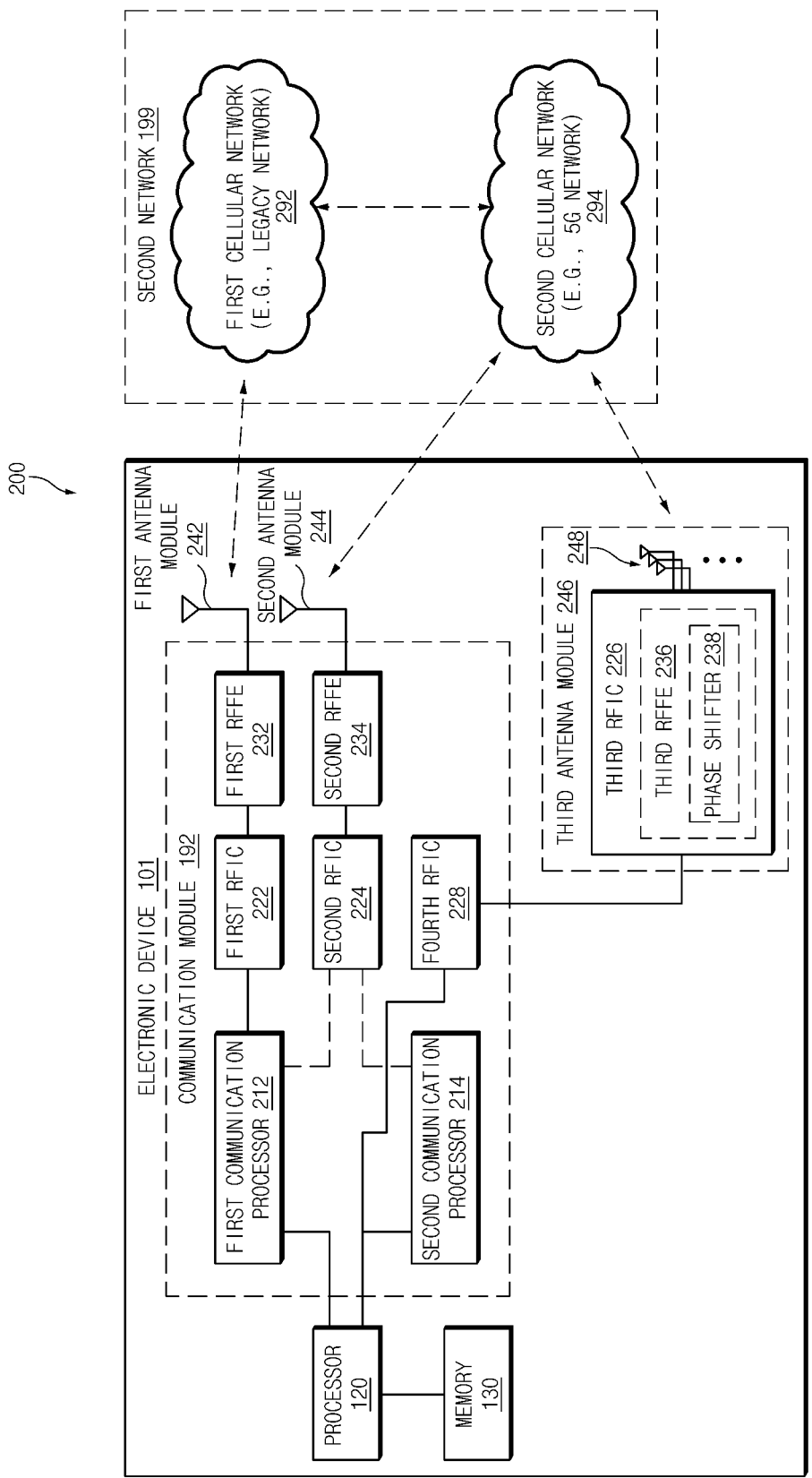
FIG. 2 is a block diagram of an electronic device for supporting a legacy network communication and a 5G network communication according to certain embodiments.

FIG. 1-4 describes an electronic device wherein an antenna according to certain embodiments of this disclosure may be used. FIG. 1 is a block diagram of an electronic device 101 in a network environment 100. FIG. 2 is a block diagram of wireless communication module. FIGS. 3A and 3B describe a housing of an electronic device 101, and FIG. 4 describes an interior of the housing.

Electronic Device

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device 101 may transmit and/or receive a radio frequency (RF) signal representing a voice signal or data (e.g., a message, a picture, a video, a music file, or a game) by using an antenna, e.g., antenna module 197. The antenna may simultaneously transmit and receive signals belonging to different frequency bands. The electronic device may service a global communication band by using signals belonging to different frequency bands. For example, the electronic device may perform communication (e.g., a global positioning system (GPS), Legacy, and Wifi1) that uses signals belonging to a low frequency band (LB), and/or communication (e.g., Wifi2) that uses signals belonging to a high frequency band (HB).

FIG. 2 discloses antenna simultaneously transmitting and receiving signals belonging to different frequency bands.
Communication Module FIG. 2 is a block diagram 200 of the electronic device 101 for supporting a legacy network communication and a 5G network communication according to certain embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The network 199 may include a first network 292 and a second network 294.

The electronic device 101 may service a global communication band by using signals belonging to different frequency bands. For example, the electronic device may perform communication that uses signals belonging to a legacy network 292, and/or communication that uses signals belonging to a second cellular network 294.

The electronic device 101 may further include at least one of the components illustrated in FIG. 1, and the network 199 may further include at least one another network. The first communication processor 212, the second communication processor 214, the first RFIC 222, the second RFIC 224, the fourth RFIC 228, the first RFFE 232, and the second RFFE 234 may constitute at least a portion of the wireless communication module 192. The fourth RFIC 228 may be omitted or may be included at a part of the third RFIC 226.

The first communication processor 212 may establish a communication channel of a band that is to be used for wireless communication with the first network 292, and may support legacy network communication through the established communication channel. According to certain embodiments, the first network may be a legacy network including 2-generation (2G), 3G, 4G, or long-term evolution (LTE). The second communication processor 214 may establish a communication channel corresponding to a designated one (e.g., about 6 GHz to about 60 GHz) of bands that are to be used for wireless communication with the second network 294, and may support 5G network communication through the established communication channel. According to certain embodiments, the second network 294 may be a 5G network defined by a 3GPP. In addition, according to an embodiment, the first communication processor 212 or the second communication processor 214 may establish a communication channel corresponding to another designated one (e.g., about 6 GHz or less) of bands that are to be used for wireless communication with the second network 294, and may support 5G network communication through the established communication channel. According to an embodiment, the first communication processor 212 and the second communication processor 214 may be implemented in a single chip or a single package. According to certain embodiments, the first communication processor 212 or the second communication processor 214 may be disposed in a single chip or a single package together with the processor 120, the auxiliary processor 123 of FIG. 1, or the communication module 190. For example, the processor 120 and the first communication processor 212, or the processor 120 and the second communication processor 214 may be coupled to each other.

The first RFIC 222 may convert a baseband signal generated by the first communication processor 212 into a radio frequency signal of about 700 MHz to about 3 GHz used for the first network 292 (e.g., the legacy network) during transmission of signals. An RF signal may be acquired from the first network 292 (e.g., the legacy network) through an antenna (e.g., the first antenna module 242) and the acquired RF signal may be preprocessed through an RFFE (e.g., the first RFFE 232), during reception of signals. The first RFIC 222 may convert the preprocessed RF signal to a baseband signal such that the preprocessed RF signal is processed by the first communication processor 212.

The second RFIC 224 may convert a baseband signal generated by the first communication processor 212 or the second communication processor 214 to an RF signal (hereinafter, a 5G sub6 RF signal) of a Sub6 band (e.g., about 6 GHz or less) used for the second network 294 (e.g., the 5G network) during transmission of signals. A 5G Sub6 RF signal may be acquired from the second network 294 (e.g., the 5G network) through an antenna (e.g., the second antenna module 244) and the acquired RF signal may be preprocessed through an RFFE (e.g., the second RFFE 234), during reception of signals. The second RFIC 224 may convert the preprocessed 5G Sub6 RF signal to a baseband signal such that the preprocessed 5G Sub6 RF signal is processed by a corresponding one of the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., about 6 GHz to about 60 GHz) that is to be used for the second network 294 (e.g., the 5G network). A 5G Above6RF signal may be acquired from the second network 294 (e.g., the 5G network) through an antenna (e.g., the antenna 248) and may be preprocessed through a third RFFE 236 during reception of signals to be converted to an intermediate frequency signal (IF) (e.g., about 13 GHz to about 17 GHz). The third RFIC 226 may convert the RF signal obtained through the conversion to a baseband signal such that the RF signal is processed by the second communication processor 214. According to an embodiment, the third RFFE 236 may be included at a part of the third RFIC 226.

According to an embodiment, the electronic device 101 may further include the fourth RFIC 228. As shown in FIG. 2, the fourth RFIC 228 may be formed separately from the third RFIC 226. However, the disclosure is not limited thereto, and the fourth RFIC 228 may be included in the third RFIC 226. The fourth RFIC 228 may be directly connected to the processor 120 through PCIe. In this case, the fourth RFIC 228 may convert the baseband signal generated by the second communication processor 214 into an RF signal (hereinafter, an IF signal) of an intermediate frequency band (e.g., about 9 GHz to about 11 GHz), and then may deliver the IF signal to the third RFIC 226. The third RFIC 226 may covert the IF signal to a 5G Above6 RF signal. A 5G Above6 RF signal may be received from the second network 294 (e.g., the 5G network) through an antenna (e.g., the antenna 248) and may be converted to the IF signal by the third RFIC 226. The fourth RFIC 228 may convert the IF signal to a baseband signal such that the baseband signal is processed by the second communication processor 214.

The first RFIC 222 and the second RFIC 224 may be implemented as at least a portion of a single chip or a single package. According to an embodiment, the first RFFE 232 and the second RFFE 234 may be implemented as at least a portion of a single chip or a single package. According to an embodiment, at least one of the first antenna module 242 or the second antenna module 244 may be omitted or coupled to another antenna module to process RF signals of a plurality of corresponding bands.

The third RFIC 226 and the antenna 248 may be disposed in the same substrate to constitute a third antenna module 246. For example, the wireless communication module 192 or the processor 120 may be disposed in a first substrate (e.g., a main PCB). The third RFIC 226 may be disposed in a partial area (e.g., a lower surface) of a second substrate (e.g., a sub-PCB) that is separate from the first substrate and the antenna 248 may be disposed in another partial area (e.g., an upper surface) to constitute the third antenna module 246. According to an embodiment, the antenna 248, for example, may include an antenna array that may be used for beam forming. The length of a transmission line between the third RFIC 226 and the antenna 248 can be reduced by arranging the third RFIC 226 and the antenna 248 in the same substrate. For example, this can reduce loss of a signal of a high-frequency band (e.g., about 6 GHz to about 60 GHz) used for the 5G network communication due to the transmission line. Accordingly, the electronic device 101 can improve the quality or speed of the communication with the second network 294 (e.g., the 5G network).

The second network 294 (e.g., the 5G network) may be operated independently from (e.g., Stand-Alone SA) or in conjunction (e.g., Non-Stand Alone NSA) with the first network 292 (e.g., the legacy network). For example, only an access network (e.g., a 5G radio access network (RAN) or a next generation (NG) RAN) may be present in the 5G network, and a core network (e.g., a next generation core (NGC)) may not be present. The electronic device 101 may access an access network of the 5G network, and then, may access an external network (e.g., the internet) under the control of a core network (e.g., an evolved packed core (EPC)) of the legacy network. Protocol information (e.g., LTE protocol information) for communication with the legacy network or protocol information (e.g., a new radio (NR) protocol information) for communication with the 5G network may be stored in a memory 230, and be accessed by another component (e.g., the processor 120, the first communication processor 212, or the second communication processor 214).

The placement of the antenna, 242, 244, and 246 presents a number of issues. Generally speaking, the front surface has very little room because of the display, and front facing cameras. It also may not be easy to place an antenna in the interior of the electronic device due to the amount of space.

To allow the electronic device to support new frequency bands, when the number of radiators included in the electronic device may increase but as space of the electronic device decrease, a radiation performance of the antenna in the interior may decrease.

Housing

Figure 3A:
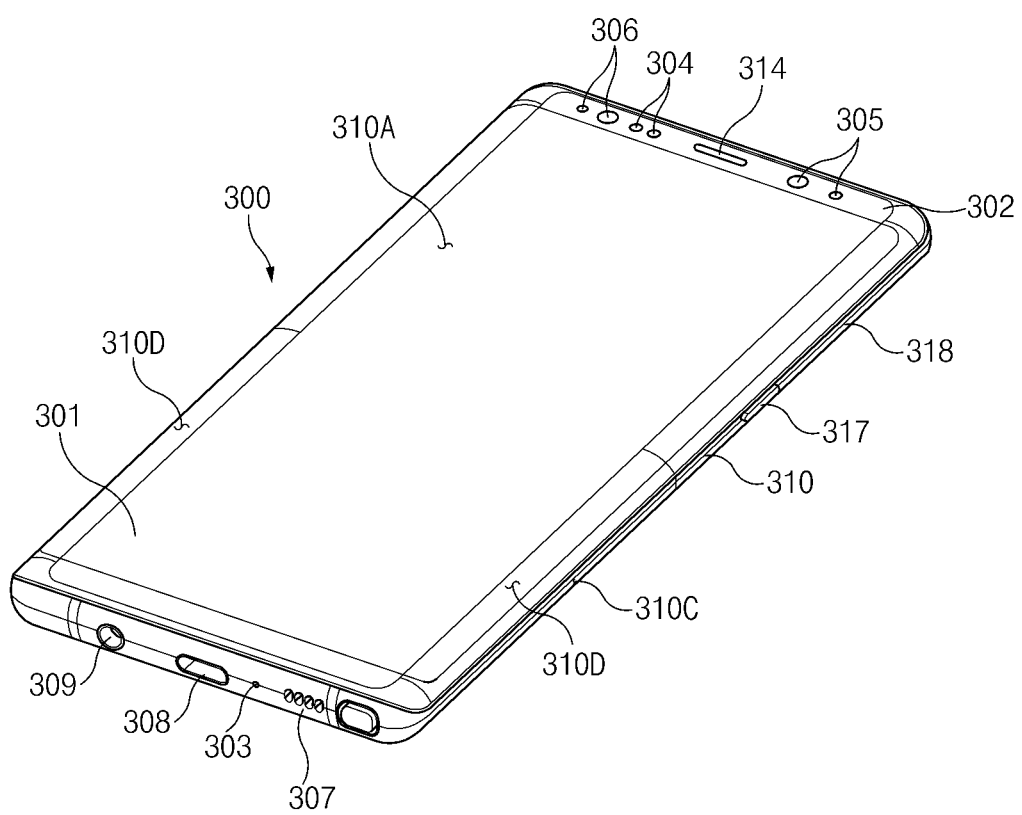
FIG. 3A is a perspective view of a front surface of an electronic device according to an embodiment.
Figure 3B:
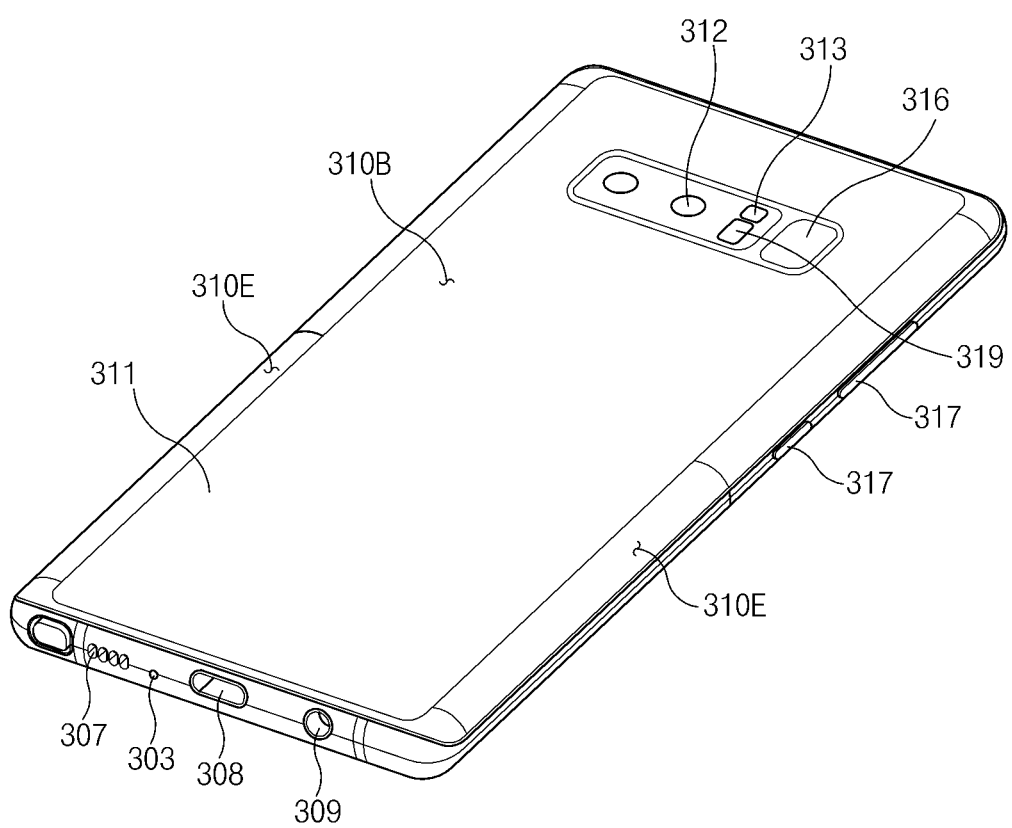
FIG. 3B is a perspective view of a rear surface of an electronic device according to an embodiment.
Figure 4:
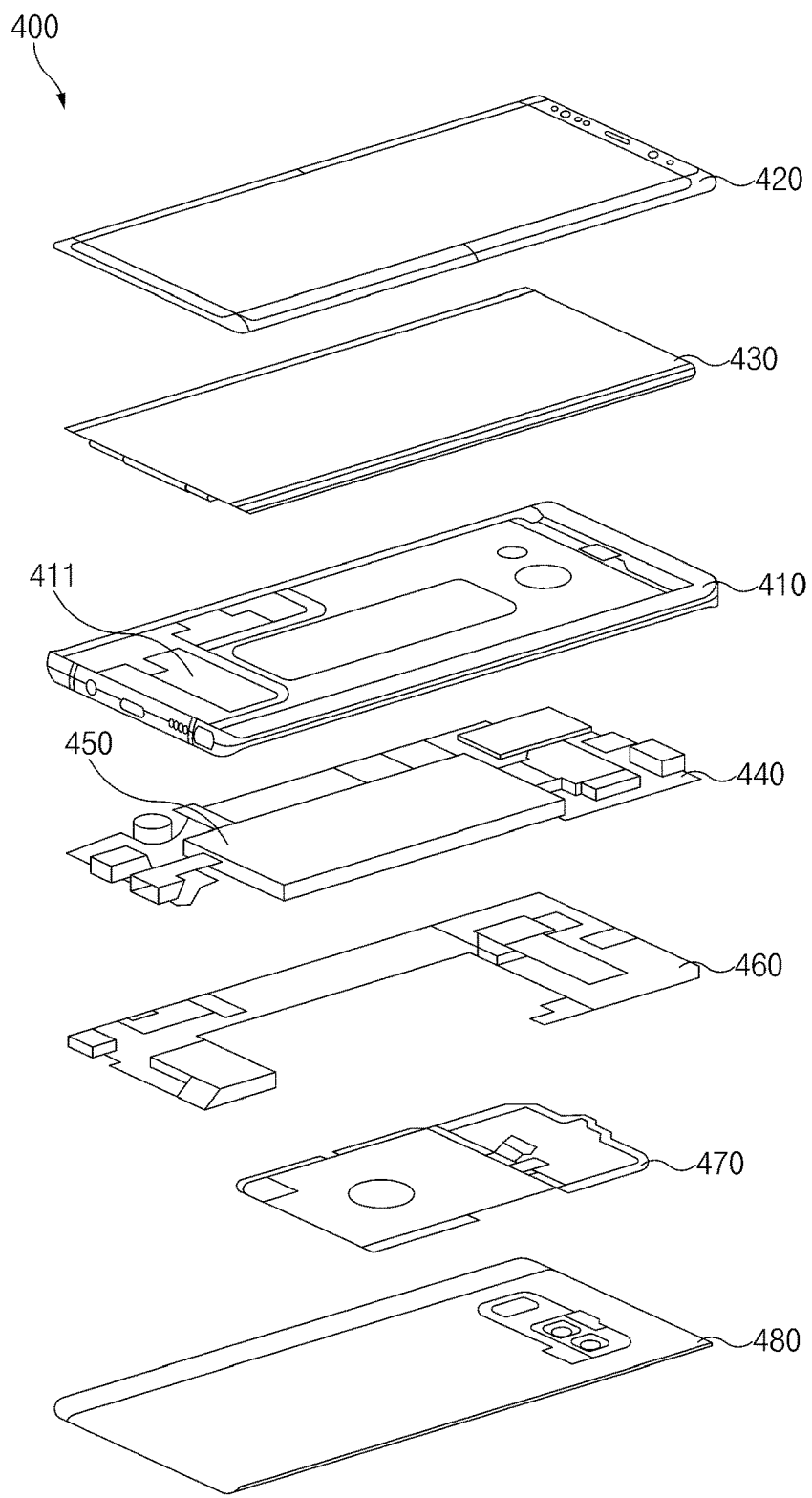
FIG. 4 is an exploded perspective view of an electronic device according to an embodiment.

FIGS. 3A and 3B describe the front and rear of the housing, while FIG. 4 describes the interior of the housing.

FIG. 3A is a perspective view of a front surface of an electronic device 300 (e.g., the electronic device 101 of FIG. 1) according to an embodiment. FIG. 3B is a perspective view of a rear surface of the electronic device 300 according to an embodiment.

Referring to FIGS. 3A and 3B, the electronic device 300 according to an embodiment may include a housing 310 including a first surface (or a front surface) 310A, a second surface (or a rear surface) 310B, and a side surface 310C surrounding a space between the first surface 310A and the second surface 310B. In another embodiment (not illustrated), the housing may refer to a structure that defines some of the first surface 310A, the second surface 310B, and the side surface 310C of FIG. 1. According to an embodiment, the first surface 310A may be defined by a front plate 302 (e.g., a glass plate or a polymer plate including various coating layers), at least a portion of which is substantially transparent. The second surface 310B may be defined by a substantially opaque rear plate 311. The rear plate 311, for example, may be formed of coated or colored glass, ceramics, a polymer, a metal (e.g., aluminum, stainless steel (STS), or magnesium), or a combination of at least two thereof. The side surface 310C may be coupled to the front plate 302 and the rear plate 311, and may be defined by a side bezel structure (or 'a side member') 318 including a metal and/or a polymer. In some embodiments, the rear plate 311 and the side bezel structure 318 may be integrally formed and may include the same material (e.g., a metallic material such as aluminum).

In the illustrated embodiment, the front plate 302 may include two first areas 310D that are deflected from the first surface 310A toward the rear plate 311 and extend seamlessly, at opposite ends of a long edge of the front plate 302. In the illustrated embodiment (see FIG. 3B), the rear plate 311 may include two second areas 310E that are deflected from the second surface 310B toward the front plate 302 and extend seamlessly, at opposite ends of a long edge of the rear plate 311. In some embodiments, the front plate 302 (or the rear plate 311) may include only one of the first areas 310D (or the second areas 310E). In other embodiment, some of the first areas 310D or the second areas 310E may not be included. In the embodiments, when viewed from a side of the electronic device 300, the side bezel structure 318 may have a first thickness (width) on a side surface, on which neither the first areas 310D nor the second areas 310E are included, and may have a second thickness that is smaller than the first thickness on a side surface, on which the first areas 310D or the second areas 310E are included.

The first surface 310A is primarily occupied by the display 301, sensor module 304, cameras 305, light emitting elements 306, and an audio module 314. Accordingly, there is very little room on the first surface 310A for the antenna. Rather, at least one antenna radiator (e.g., a conductive pattern) may be disposed in the side member (e.g., the side bezel structure 318 of FIG. 3) of the housing 310 of the electronic device 300, the two first areas 310D deflected from the first surface 310A of the front plate 302 toward the rear plate 311 and extending seamlessly, or the two second areas 310E deflected from the second surface 310B of the rear plate 311 toward the front plate 302 and extending seamlessly.

In an embodiment, at least one antenna radiator may radiate a signal of a specific frequency band. In an embodiment, at least one antenna radiator may be an auxiliary radiator. As an example, at least one antenna radiator may radiate a signal belonging to a 5G Sub-6 frequency band of about 3.5 GHz to about 6 GHz, such as n41, n78, and/or n79. As another example, at least one antenna radiator may radiate a frequency of a Wi-Fi frequency band. The Wi-Fi frequency band may include a frequency band, such as 802.11a and/or 802.11b.

In an embodiment, at least one antenna radiator may be a main radiator. In an embodiment, some of frequency bands radiated by the main radiator and some frequency bands radiated by the auxiliary radiator may be the same, and the remaining ones thereof may be different.

In an embodiment, as another example, at least one antenna radiator may radiate a frequency of an mmWave frequency band. For example, the mmWave frequency band may include a frequency band, such as about 24 to 34 GHz and/or about 37 to 44 GHz. As another example, at least one antenna radiator may radiate a frequency of a frequency band of 11ay.

According to an embodiment, the electronic device 300 may include at least one of a display 301 (e.g., the display device 160 of FIG. 1), audio modules 303, 307, and 314 (e.g., the audio module 170 of FIG. 1), sensor modules 304, 316, and 319 (e.g., the sensor module 176 of FIG. 1), camera modules 305, 312, and 313 (e.g., the camera module 180 of FIG. 1), a key input device 317, a light emitting element 306, and connector holes 308 and 309. In some embodiments, at least one (e.g., the key input device 317 or the light emitting element 306) of the elements may be omitted from the electronic device 300 or another component may be additionally included in the electronic device 300.

The display 301, for example, may be exposed through considerable portions of the front plate 302. In some embodiments, at least a portion of the display 301 may be exposed through the front plate 302 defining the first surface 310A, and the first areas 310D of the side surface 310C. In some embodiments, corners of the display 301 may have a shape that is substantially the same as the adjacent outer shape of the front plate 302. In other embodiments, in order to expand the area, by which the display 301 is exposed, the intervals between the outskirts of the display 301 and the outskirts of the front plate 302 may be substantially the same.

In other embodiments (not illustrated), a portion of the screen display area of the display 301 may have a recess or an opening, and may include at least one of the audio module 314, the sensor module 304, the camera module 305, and the light emitting element 306, which are aligned with the recess or the opening. In other embodiments (not illustrated), at least one of the audio module 314, the sensor module 304, the camera module 305, the fingerprint sensor 316, and the light emitting element 306 may be included on the rear surface of the screen display area of the display 301. In other embodiments (not illustrated), the display 301 may be coupled to or be disposed to be adjacent to a touch detection circuit, a pressure sensor that may measure the strength (the pressure) of a touch, and/or a digitizer that detects a stylus pen of a magnetic field type. In some embodiments, at least a portion of the sensor modules 304 and 319 and/or at least a portion of the key input device 317 may be disposed in the first areas 310D and/or the second areas 310E.

The audio modules 303, 307, 314 may include the microphone hole 303 and the speaker holes 307 and 314. A microphone for acquiring external sounds may be disposed in the microphone hole 303, and in some embodiments, a plurality of microphones may be disposed to detect the direction of a sound. The speaker holes 307 and 314 may include the external speaker hole 307 and the communication receiver hole 314. In some embodiments, the speaker holes 307 and 314 and the microphone hole 303 may be implemented by one hole or a speaker may be included while the speaker holes 307 and 314 are not employed (e.g., a piezoelectric speaker).

The sensor modules 304, 316, and 319 may generate an electrical signal or a data value corresponding to an operational state of the interior of the electronic device 300 or an environmental state of the outside. The sensor modules 304, 316, and 319, for example, may include the first sensor module 304 (e.g., a proximity sensor) and/or a second sensor module (not illustrated) (e.g., a fingerprint sensor) disposed on the first surface 310A of the housing 310, and/or the third sensor module 319 (e.g., a HRM sensor) and/or the fourth sensor module 316 (e.g., a fingerprint sensor) disposed on the second surface 310B of the housing 310. The fingerprint sensor may be disposed not only on the first surface 310A (e.g., the display 301) but also on the second surface 310B of the housing 310. The electronic device 300 may further include a sensor module (not illustrated), for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or the illumination sensor 304.

The camera modules 305, 312, and 313 may include the first camera device 305 disposed on the first surface 310A of the electronic device 300, and the second camera device 312 and/or the flash 313 disposed on the second surface 310B. The camera modules 305 and 312 may include one or a plurality of lenses, an image sensor, and/or an image signal processor. The flash 313, for example, may include a light emitting diode or a xenon lamp. In some embodiments, two or more lenses (an infrared ray camera or a wide angle/telephoto lens), and image sensors may be disposed on one surface of the electronic device 300.

The key input device 317 may be disposed on the side surface 310C of the housing 310. In another embodiment, the electronic device 300 may not include some or all of the above-mentioned key input devices 317, and the key input devices 317, which are not included, may be implemented in different forms, such as a soft key, on the display 301. In some embodiments, the key input device may include the sensor module 316 disposed on the second surface 310B of the housing 310.

The light emitting element 306, for example, may be disposed on the first surface 310A of the housing 310. The light emitting element 306, for example, may provide state information on the electronic device 300 in the form of light. In other embodiments, the light emitting element 306, for example, may provide a light source that interworks with an operation of the camera module 305. The light emitting element 306, for example, may include an LED, an IR LED, and a xenon lamp.

The connector holes 308 and 309 may include the first connector hole 308 that may accommodate a connector (e.g., a USB connector) for transmitting and receiving electric power and/or data to and from an external electronic device and/or the second connector hole (e.g., an earphone jack) 309 that may accommodate a connector for transmitting and receiving an audio signal to and from the external device.

FIG. 4 is an exploded perspective view 400 of an electronic device (e.g., the electronic device 300 of FIG. 3A and/or FIG. 3B) according to an embodiment. Referring to FIG. 4, the electronic device 300 may include a side bezel structure 410 (e.g., the side bezel structure 318 of FIG. 3A), a first support member 411 (e.g., the bracket), a front plate 420, a display 430 (e.g., the display 301 of FIG. 3A), a PCB 440, a battery 450, a second support member 460 (e.g., the rear case), a short range antenna 470, and/or a rear plate 480 (e.g., the rear plate 311 of FIG. 3). In some embodiments, at least one (e.g., the first support member 411 or the second support member 460) of the elements may be omitted from the electronic device 300 or another component may be additionally included in the electronic device 300. At least one of the components of the electronic device 300 may be the same as or similar to at least one of the components of the electronic device 300 of FIG. 1 or 2, and a repeated description thereof will be omitted.

The first support member 411 may be disposed in the interior of the electronic device 300 to be connected to the side bezel structure 410 or to be integrally formed with the side bezel structure 410. The first support member 411, for example, may be formed of a metal material and/or a nonmetal material (e.g., a polymer). The display 430 may be coupled to one surface of the first support member 411, and the PCB 440 may be coupled to an opposite surface of the first support member 411.

In an embodiment, a processor (e.g., the processor 120 of FIG. 1), a memory (e.g., the memory 130 of FIG. 1), and/or an interface (e.g., the interface 177 of FIG. 1) may be mounted on the PCB 440. The processor 120, for example, may include one or more of a central processing unit (CPU), an application processor (AP), a graphic processing unit (GPU), an image signal processor (ISP), a sensor hub processor (SHP), or a communication processor (CP). The memory, for example, may include a volatile and/or non-volatile memory. The interface, for example, may include a high definition multimedia interface (HDMI), a universal serial bus (USB) interface, an SD card interface, and/or an audio interface. The interface, for example, may electrically or physically connect the electronic device 300 to an external electronic device (e.g., the electronic device 102 and 104 of FIG. 1), and may include a USB connector, an SD card/MMC connector, or an audio connector.

The battery 450 is a device for supplying electric power to at least one component of the electronic device 300, and for example, may include a primary battery that cannot be recharged, a secondary battery that may be recharged, or a fuel cell. At least a portion of the battery 450, for example, may be disposed on the same plane as the PCB 440. The battery 450 may be integrally disposed in the interior of the electronic device 300, and may be disposed to be detachable from the electronic device 300.

The short range antenna 470 may be disposed between the rear plate 480 and the battery 450. The antenna 470, for example, may include a near field communication (NFC) antenna, a wireless charging antenna, and/or a magnetic secure transmission (MST) antenna. The antenna 470, for example, may perform short-range communication with an external device, or may wirelessly transmit and receive electric power that is necessary for charging. In another embodiment, an antenna structure may be formed by one or a combination of the side bezel structure 410 and/or the first support member 411.

Figure 5:
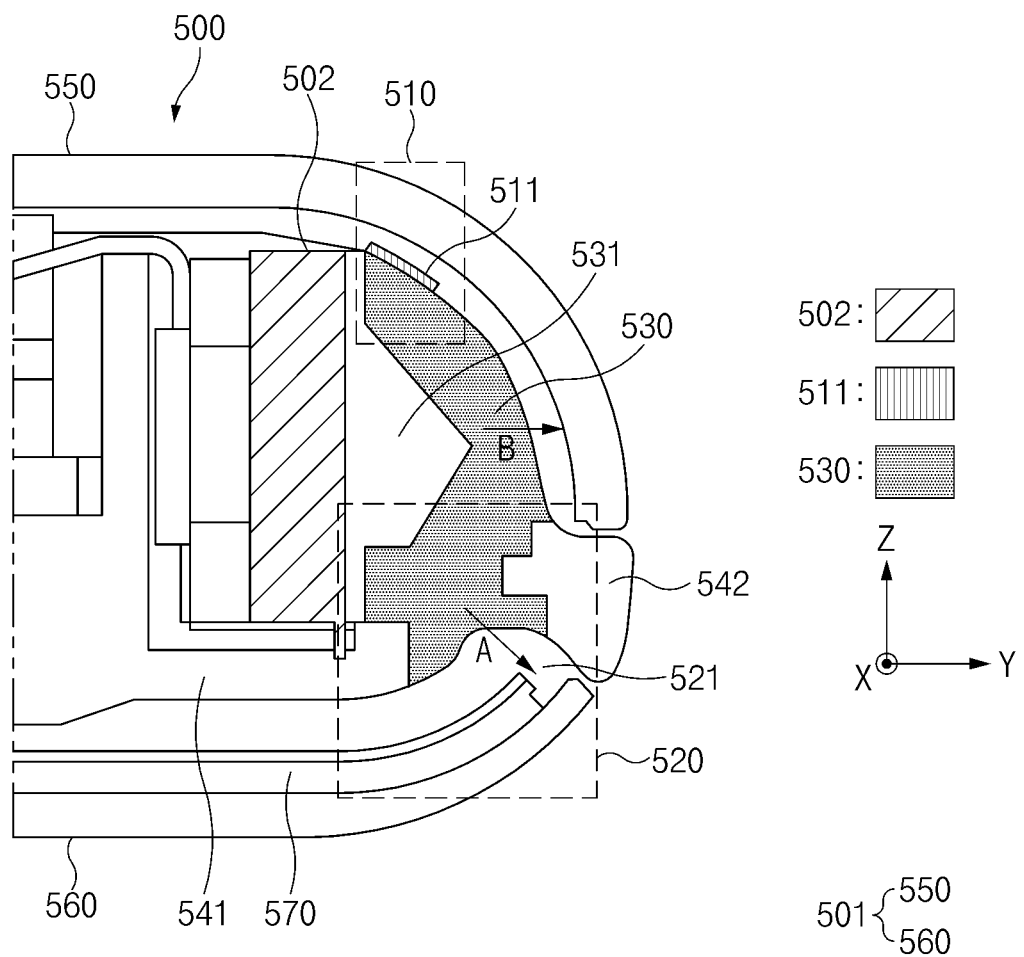
FIG. 5 is a cross-sectional view illustrating an electronic device according to an embodiment.

FIG. 5 is a cross-sectional view 500 of an electronic device (e.g., the electronic device 101 of FIG. 1) according to an embodiment. The display side is facing down (−Z), while the rear surface is facing upwards (+Z).

The electronic device 101 includes an antenna module 502 that is disposed in a space within the housing. The antenna module 502 includes at least one antenna element that is configured to transmit and receive a signal having a first carrier frequency. A nonconductive member 530 faces at least one surface of the antenna module 502. A conductive pattern 511 is disposed between the nonconductive member 530 and the rear plate 550.

A housing 501 may include a front plate 560 (e.g., the front plate 420 of FIG. 4), a rear plate 550 (e.g., the rear plate 480 of FIG. 4), and/or a side member 542 (e.g., the side bezel structure 410 of FIG. 4). The front plate 560 may face a first direction (e.g., the −Z axis direction). The rear plate 550 may face a second direction (e.g., the +Z axis direction) that is an opposite direction to the first direction (e.g., the −Z axis direction). The side member 542 may surround a space between the front plate 560 and the rear plate 550. The side member 542 may connect one side of the front plate 560 and one side of the rear plate 550.

The side member 542 may include a conductive member 541 (e.g., the first support member 411 of FIG. 4). In an embodiment, the side member 542 may be coupled to or integrally formed with the conductive member 541. The conductive member 541 may be disposed in the space. For example, the conductive member may include aluminum, stainless steel, titanium, or nickel.

An antenna module 502 (e.g., the third antenna module 246 of FIG. 2) may be disposed in the space between the front plate 560 and the rear plate 550 of the housing 501. The antenna module 502 may process a signal of a specific frequency. For example, the antenna module 502 may process an mmWave signal.

A nonconductive member 530 may face at least one surface of the antenna module 502. The nonconductive member 530 may include a polymer material. The nonconductive member 530 may be a first area 510 of the conductive member 541 around the antenna module 502 and an injection-molded product disposed around the first area 510. For example, at least a portion of the nonconductive member 530 may be disposed in the first direction (the −Z axis direction) from the first area 510, and the remaining portions of the nonconductive member 530 may be disposed in a third direction (the +Y axis direction) from the first area 510. The nonconductive member 530 may be disposed to be spaced apart from the antenna module 502. For example, a space 531 filled with air may be formed between the antenna module 502 and the nonconductive member 530.

The nonconductive member 530 may support the antenna module 502 such that the antenna module 502 is mounted at a specific location of an interior space of the housing 501. For example, the antenna module 502 may be supported to be disposed in a second direction (the +Z axis direction) of the nonconductive member 530. In this case, the antenna module 502 may form a beam pattern such that the beam pattern faces the side member 542.

The nonconductive member 530 may be adjacent to the side member 542 of the housing 501, between the side member 542 and the antenna module 502.

A space 531 may be formed between the nonconductive member 530 and the antenna module 502. For example, at least a partial area of a surface of the nonconductive member 530, which faces the antenna module 502 of the nonconductive member 530, may be convex. The convex area of the nonconductive member 530 may change a travel path of a radio frequency signal radiated from the antenna module 502. The nonconductive member 530 may contact the side member 542 and the conductive member 541. One surface of the nonconductive member 530 may include another convex area, and a separating wall located between the at least a partial area and the another partial area.

A conductive pattern 511 may be disposed between the nonconductive member 530 and the rear plate 550. The conductive pattern 511 may be disposed in the second direction (e.g., the +Z axis direction) closer to the rear plate 550 than to the front plate 560. In an embodiment, the conductive pattern 511 may be disposed to be spaced apart from the antenna module 502. For example, the conductive pattern 511 may be adjacent to a surface of the antenna module 502, facing the second direction (the +Z axis direction). For example, the conductive pattern 511 may be formed by a flexible printed circuit board (FPCB). As another example, the conductive pattern 511 may be formed through laser direct structuring (LDS).

The conductive pattern 511 may be disposed in the first area 510 (e.g., the first area 310D of FIG. 3A) of the nonconductive member 530. The first area 510, for example, may be at least a partial area of a bending area, in which the rear plate 550 extends in the third direction (e.g., the +Y axis direction) and is bent in the first direction (e.g., the −Z axis direction). The first area 510 may be an area that does not overlap the side member 542 when the antenna module 502 is viewed in the +Y axis direction. The conductive pattern 511 may be disposed in the first area 510.

The conductive pattern 511 may change a radiation pattern of a first signal belonging to the first frequency band. The first frequency band, for example, may be a frequency band of about 15 GHz to about 100 GHz. For example, the first frequency band may include a 5G mmWave band.

The conductive pattern 511 may change the first radiation pattern that is the radiation pattern of the first signal. The radiation pattern of the first signal may initially be in the +Y axis direction, or perpendicular to the directions that the front plate and rear plate face, the Z axis. For example, the conductive pattern 511 may reflect at least a portion of the first radiation pattern in the +Z axis direction. For example, the conductive pattern 511 may perform a role of a reflector that reflects the first signal in the +Y axis direction.

The conductive pattern 511 may use a common ground with the antenna module 502. For example, the conductive pattern 511 may be connected to a ground layer disposed in a main PCB (e.g., the PCB 440 of FIG. 4). As another example, the conductive pattern 511 may be connected to the conductive member 541 (e.g., a metal bracket) in the interior of the electronic device 101.

The conductive pattern 511 may radiate a second signal belonging to a second frequency band that is different from the first frequency band. The second frequency band may be a frequency band of about 3 GHz to about 6 GHz. For example, the second frequency band may be a 5G Sub-6 frequency band.

A nonconductive member 521 may be formed at at least a portion of a second part 520 of the front plate 560. The nonconductive member 521 may be formed between the front plate 560 and the side member 542. The nonconductive member 521 may be formed in a direction (e.g., direction A) between the first direction (the −Z axis direction) and the third direction (direction B).

A radiation performance in the first direction (the −Z axis direction) or to the front side of the electronic device 101 may be decreased by the conductive material included in the conductive member 541 and a display 570. The nonconductive member 521 may enhance the radiation performance to the front side by forming a path, in which the electronic device 101 may radiate a signal to the front side.

Figure 6:
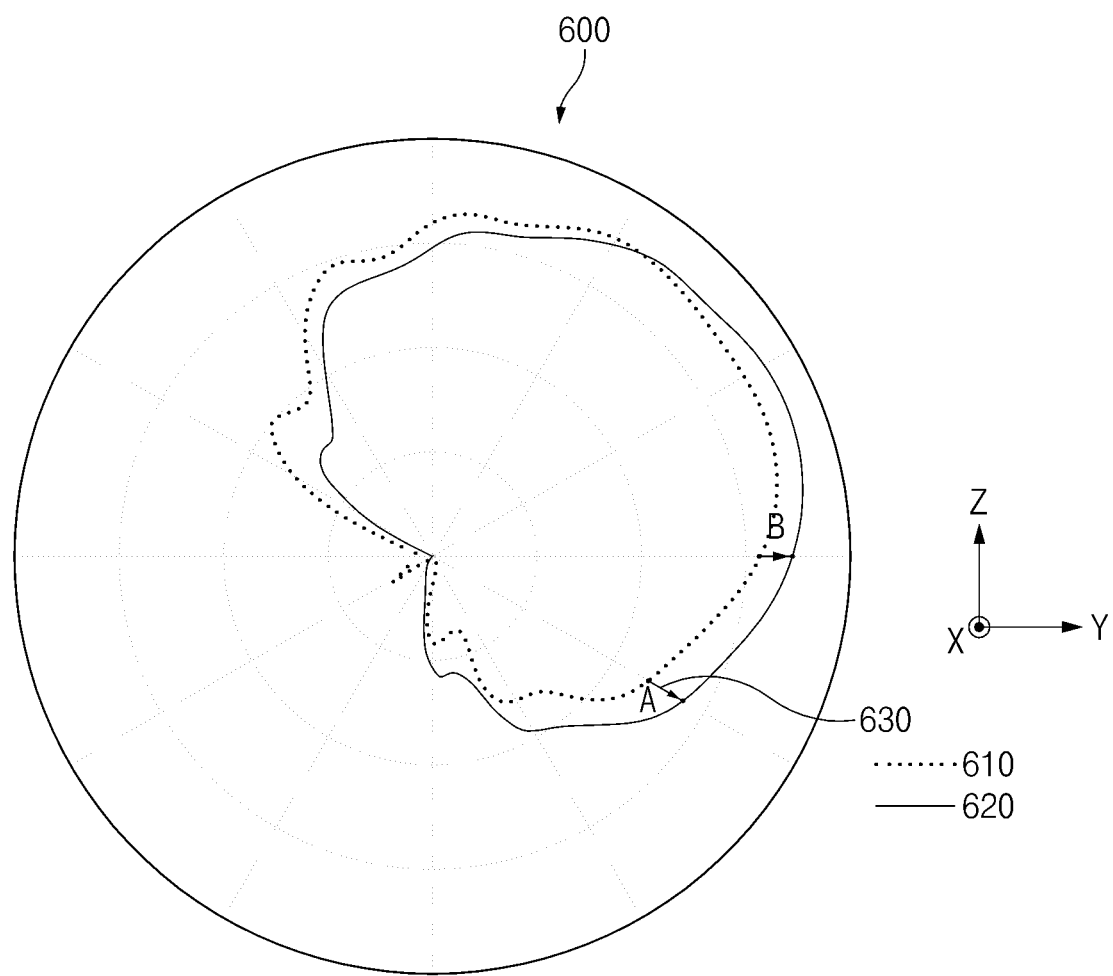
FIG. 6 is a view illustrating a radiation pattern of a first frequency band according to a comparative example and a radiation pattern of the first frequency band according to an embodiment.

FIG. 6 is a polar graph 600 illustrating a radiation pattern 610 of a first frequency band according to a comparative example and a radiation pattern 620 of the first frequency band according to an embodiment.

The radiation pattern 610 of the first frequency band of the comparative example may perform a main radiation to the rear plate (e.g., the second direction (e.g., the +Z axis direction) that is a direction of the rear plate 550 of FIG. 5) in a vertical mounting structure (e.g., a structure, in which the antenna module 502 of FIG. 5 is mounted to face the third direction (e.g., the +Y axis direction) of the antenna module (e.g., the antenna module 502 of FIG. 5). In the comparative example, a radiation performance in a direction of the front side of the electronic device 101, which is the first direction (the −Z axis direction) of the electronic device (e.g., the electronic device 101 of FIG. 1) may be decreased. In the comparative example, an overall coverage performance of the electronic device 101 may be decreased due to the decreasing of the radiation performance in the first direction (the −Z axis direction) to a specific level or less.

The electronic device 101 may include a conductive pattern (e.g., the conductive pattern 511 of FIG. 5) that may change a direction of the radiation pattern in an injection-molding area (e.g., the first area 510 of the nonconductive member 530 of FIG. 3) proximate to the antenna module 502. The conductive pattern 511 may enhance the coverage performance of the electronic device 101 in a specific direction by changing the direction of the radiation pattern of the electronic device 101. The radiation pattern 620 according to an embodiment may enhance the radiation performance in the first direction (the −Z axis direction) and/or the third direction (the +Y axis direction) as compared with the radiation pattern 610 according to the comparative example.

In an embodiment, the radiation performance in the first direction (the −Z axis direction) and/or the third direction (the +Y axis direction) of the electronic device 101 may be enhanced by using the conductive pattern 511. For example, the radiation performance in direction A may be enhanced from about 1.9 dB to about 3.9 dB by about 2 dB, by the conductive pattern 511. For example, a size of the radiation pattern 620 according to an embodiment may be increased in direction A at a specific first point 630 by about 2 dB as compared with a size of the radiation pattern 610 according to the comparative example. For example, by the conductive pattern 511, radiation characteristics of a vertical polarization component that is radiated in direction A and shows polarization characteristics in the first direction (e.g., the −Z axis direction) and/or the second direction (e.g., the +Z axis direction) may be enhanced by about +0.8 dB to about +1.2 dB, and radiation characteristics of a horizontal polarization component that shows polarization characteristics in the +X axis direction and/or the −X axis direction may be enhanced by about +1.8 dB to about +2.2 dB.

In an embodiment, a gain value in a reference direction (a bore sight) of the electronic device 101 may be enhanced by about +0.7 dB in a vertical direction and about +2 dB in a horizontal direction, by the conductive pattern 511. By the conductive pattern 511, radiation characteristics of a vertical polarization component that is radiated in direction B (e.g., the third direction (the +Y axis direction)) and shows polarization characteristics in the first direction (e.g., the −Z axis direction) and/or the second direction (the +Z axis direction) may be enhanced by about +0.6 dB to about +0.8 dB. By the conductive pattern 511, radiation characteristics of a horizontal polarization component that shows polarization characteristics in the +X axis direction and/or the −X axis direction may be enhanced by about +1.8 dB to about +2.2 dB. Due to an influence of the conductive member (e.g., the side member 542 of FIG. 5), the vertical polarization component may be influenced by the radiation characteristics, and the horizontal polarization component may be influenced less by the radiation characteristics as compared with the vertical polarization component.

Figure 7:
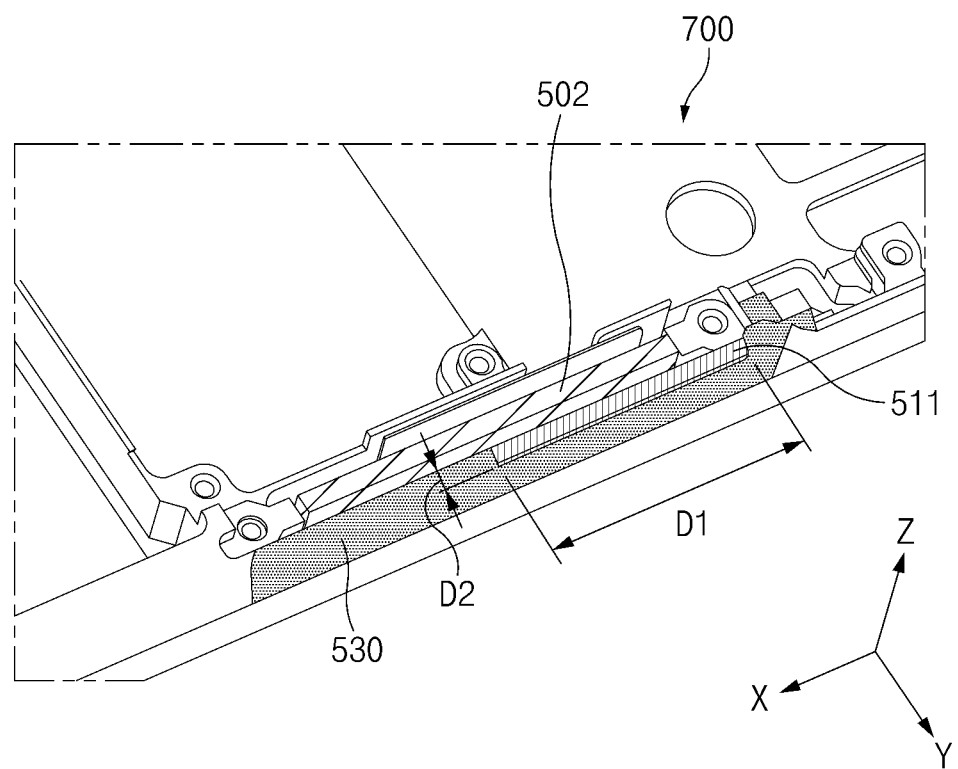
FIG. 7 is a view illustrating a conductive pattern of an electronic device according to an embodiment.

FIG. 7 is a view 700 illustrating the conductive pattern 511 of the electronic device (e.g., the electronic device 101 of FIG. 1) according to an embodiment.

The conductive pattern 511 may be adjacent to the antenna module 502. The conductive pattern 511 may face the the side member (e.g., the side member 542 of FIG. 5) of the housing, rather than to face the antenna module 502. The conductive pattern 511 may be disposed on the nonconductive member 530 to not overlap the antenna module 502 when viewed in the +Y axis direction.

The conductive pattern 511 may have a first length D1 in a fourth direction (e.g., the X axis direction). For example, the fourth direction (e.g., the X axis direction) may be a direction that extends along the side member 542. The first length D1 may be set according to the second frequency band of the second signal. For example, when the second frequency band is a band of 5G Sub-6, the first length D1 may be about 16 mm, or between 15.5 mm to 16.5 mm.

The conductive pattern 511 may have a second length D2 in the third direction (e.g., the +X axis direction). The second length D2 may be set according to a width of the nonconductive member 530 in the third direction (+X axis direction) and/or a mounting method of the conductive pattern 511. For example, the second length D2 may be about 1 mm to about 3 mm.

Figure 8:
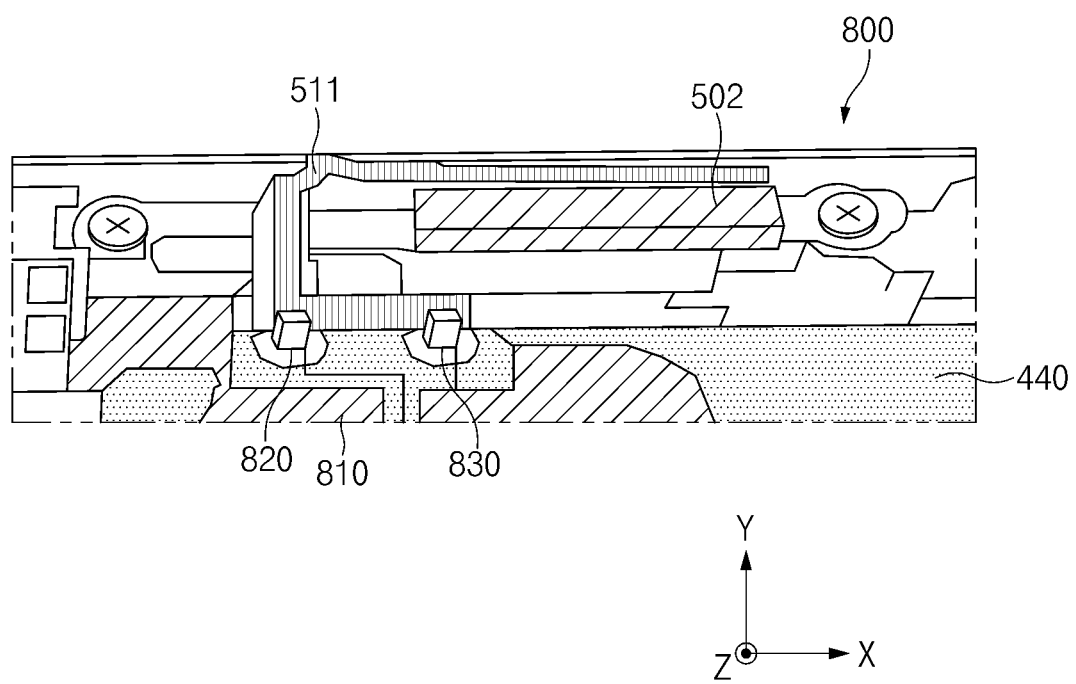
FIG. 8 is a view illustrating a conductive pattern of an electronic device according to an embodiment.

FIG. 8 is a view 800 illustrating the conductive pattern 511 of the electronic device (e.g., the electronic device 101 of FIG. 1) according to an embodiment.

The conductive pattern 511 may be formed by a flexible printed circuit board (FPCB). The conductive pattern 511 may be disposed to extend along at least one surface of the antenna module 502. For example, the conductive pattern 511 may extend along one of the side surfaces of the antenna module 502, which is disposed along the third direction (the +X axis direction). The conductive pattern 511 may be disposed on the nonconductive member (e.g., the nonconductive member 530 of FIG. 5).

The conductive pattern 511 may be located on the nonconductive member (e.g., the nonconductive member 530 of FIG. 5). The antenna module 502 may be mounted to face the side member 542 of the electronic device 101. The conductive pattern 511 may be formed through an FPCB or an LDS. The conductive pattern 511 may be connected to the wireless communication circuit (e.g., the wireless communication module 192 of FIG. 1) disposed in the PCB 440 to be operated as an antenna. The conductive pattern 511 may be fed with electric power for radiating a second signal, from the wireless communication circuit 192. The wireless communication circuit 192 may be connected to the conductive pattern 511 through a first connector 820, such as a side contact, to feed electric power of the second signal. For example, the first connector 820 may be a C-clip. According to an embodiment, the conductive pattern 511 may be connected to the wireless communication circuit 192 through the first connector 820 to be operated as an antenna.

The conductive pattern 511 may be connected to the ground through a second connector 830. The second connector 830 may be disposed or omitted. For example, the conductive pattern 511 may be connected to the ground of a structure of a planar inverted-F antenna (PIFA) through the second connector 830. For example, the second connector 830 may be connected to a ground layer 810 of the PCB 440. As another example, the second connector 830 may be connected to another ground layer, such as a metal bracket (e.g., the conductive member 541 of FIG. 5) to be used as a ground part of the conductive pattern 511.

Figure 9:
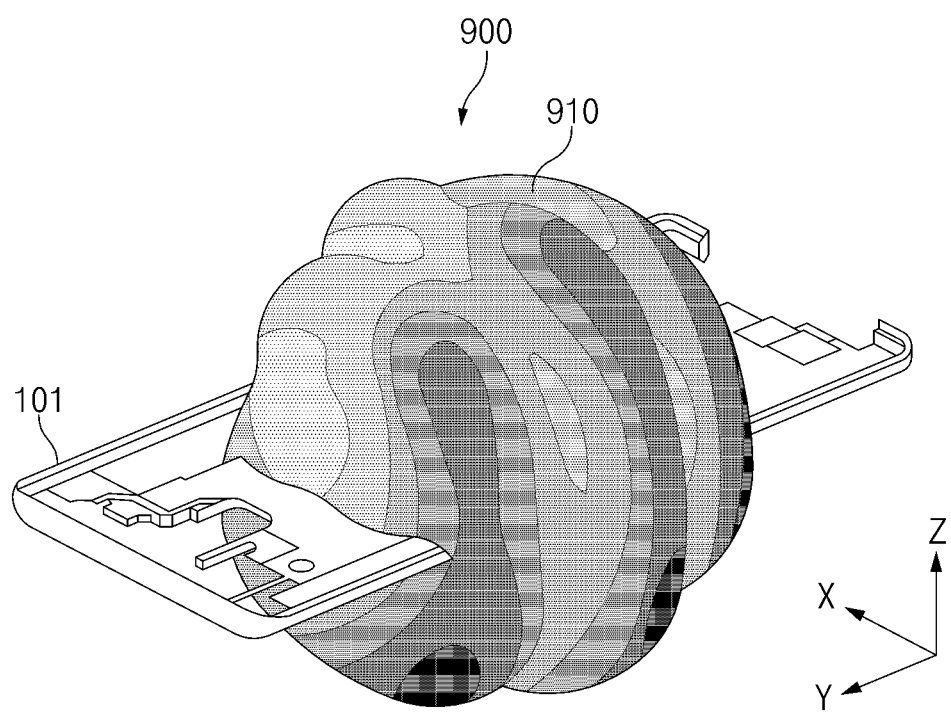
FIG. 9 is a view illustrating a radiation pattern of a second frequency band of an electronic device according to an embodiment.

FIG. 9 is a view 900 illustrating a radiation pattern 910 of a second frequency band of the electronic device (e.g., the electronic device 101 of FIG. 1) according to an embodiment.

A conductive pattern (e.g., the conductive pattern 511 of FIG. 7) may be disposed in a nonconductive member (e.g., the nonconductive member 530 of FIG. 7) that faces and/or supports an antenna module (e.g., the antenna module 502 of FIG. 7). The radiation pattern 910 may be formed when a signal belonging to a second frequency band is fed to the conductive pattern 511. The radiation pattern 910 may be formed uniformly in a rearward direction (e.g., the +Z axis direction) and a forward direction (e.g., the −Z axis direction) of the electronic device 101.

Figure 10:
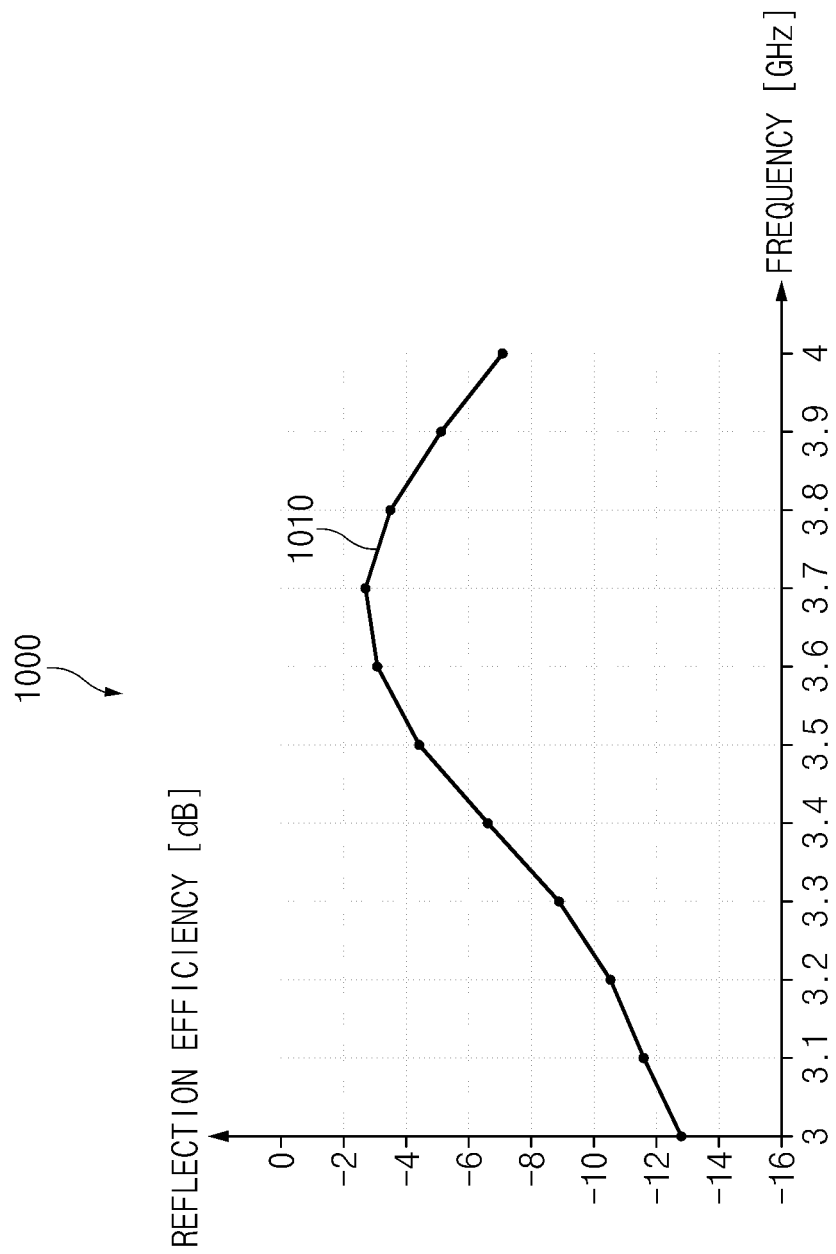
FIG. 10 is a graph illustrating a reflection efficiency of a second frequency band of an electronic device according to an embodiment.

FIG. 10 is a graph 1000 illustrating a reflection efficiency as measured in dB of a second frequency band (3 GHz-4 GHz) as a function of frequency.

The conductive pattern (e.g., the conductive pattern 511 of FIG. 7) may have the first length D1 in the third direction (e.g., the X axis direction of FIG. 7) along the side member (e.g., the side member 542 of FIG. 5). A graph 1010 may be a simulation result for the second frequency band using the conductive pattern 511. For example, the second frequency band may include an n78 frequency band of a 5G Sub-6 frequency band. The n78 frequency band, for example, may be a frequency band of about 3.3 GHz to about 3.8 GHz. For example, the first length D1 may be about 16 mm. The reflection efficiency of the graph 1010 may be about −3 dB at about 3.7 GHz. For example, the conductive pattern 511 may be an antenna radiator that radiates the n78 frequency band. A length of the nonconductive member (e.g., the nonconductive member 530 of FIG. 7) in the third direction (the X axis direction) may be about 16 mm to 40 mm such that the conductive pattern 511 is disposed. Accordingly, the antenna radiator that radiates a signal of the second frequency band may be implemented in a space on the nonconductive member 530 by adjusting a length of the conductive pattern 511 in the third direction (the X axis direction).

Figure 11:
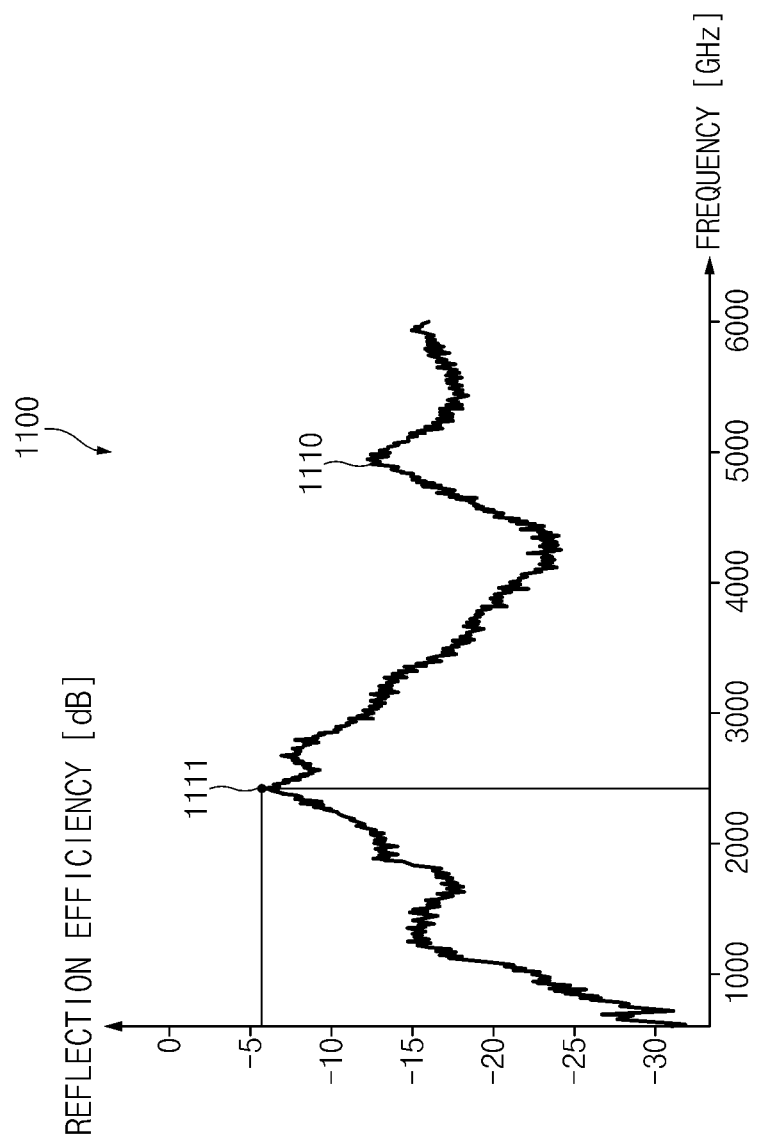
FIG. 11 is a graph illustrating a reflection efficiency of a second frequency band of an electronic device according to an embodiment.

FIG. 11 is a graph 1100 illustrating a reflection efficiency of a second frequency band of the electronic device (e.g., the electronic device 101 of FIG. 1) according to an embodiment.

The second frequency band may include a Wi-Fi frequency band. For example, the second frequency band may be a 802.11 frequency band having a frequency of about 2.4 GHz.

A graph 1110 may have a value 1111 of a reflection efficiency at a frequency of about 2.4 GHz. The value 1111 of the reflection efficiency may be about −6 dB. Accordingly, an antenna radiator that radiates a signal of a Wi-Fi frequency band may be implemented in a space on the nonconductive member (e.g., the nonconductive member 530 of FIG. 7).

Figure 12A:
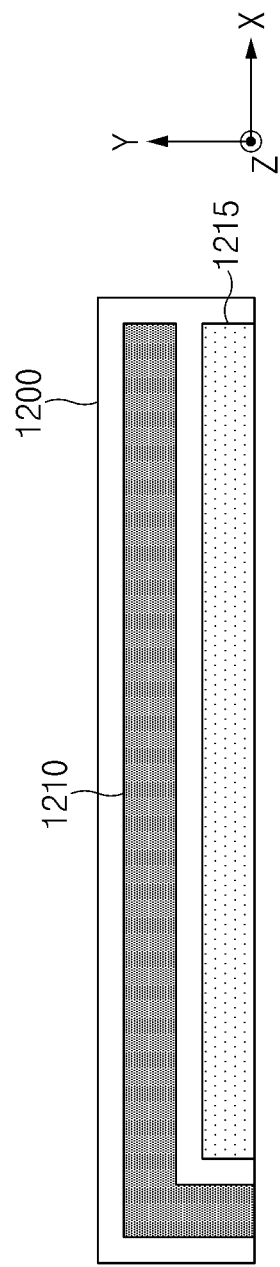
FIG. 12A is a view illustrating an FPCB antenna, a first conductive pattern, and a second conductive pattern of an electronic device according to an embodiment.
Figure 12B:
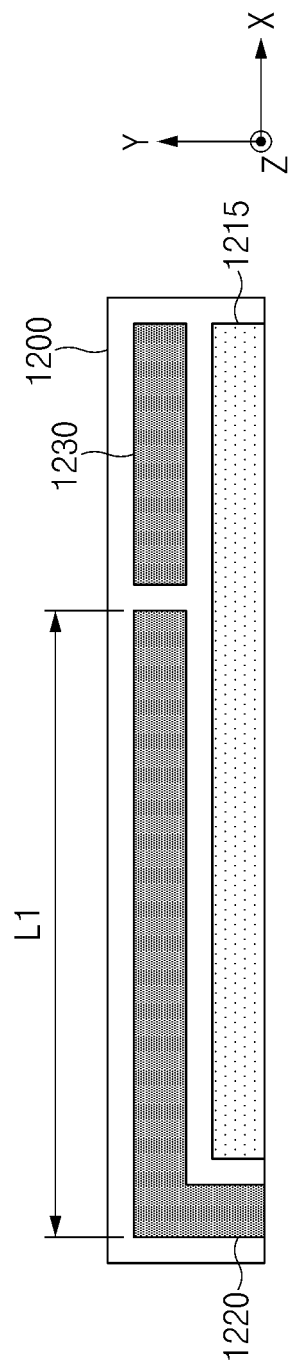
FIG. 12B is a view illustrating an FPCB antenna, a first conductive pattern, a second conductive pattern, and a dummy pattern of an electronic device according to an embodiment.
Figure 12C:
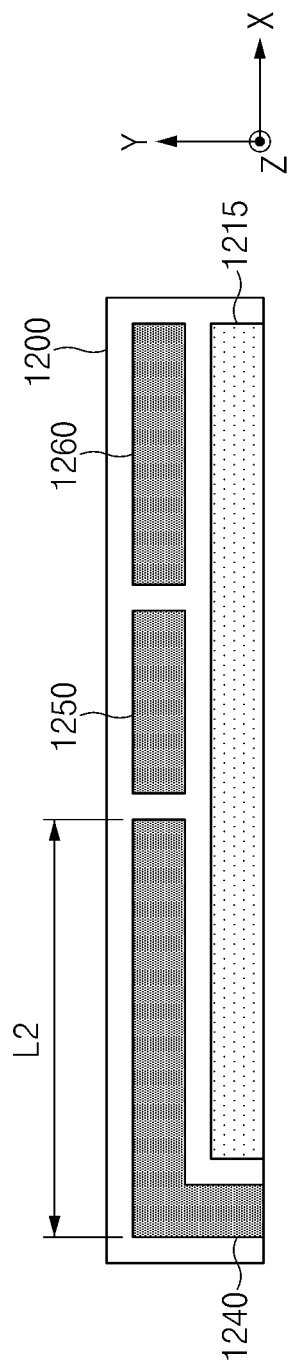
FIG. 12C is a view illustrating an FPCB antenna, a first conductive pattern, a second conductive pattern, and a plurality of dummy patterns of an electronic device according to an embodiment.

The conductive pattern can be formed on a printed circuit board (FPCB). FIGS. 12A-12C describes conductive patterns disposed on an FPCB, thereby forming a FPCB antenna FIG. 12A is a view illustrating a flexible printed circuit board (FPCB) antenna 1200 of an electronic device (e.g., the electronic device 101 of FIG. 1) according to an embodiment.

The flexible printed circuit board (FPCB) antenna 1200 may include a first conductive pattern 1210 (e.g., the conductive pattern 511 of FIG. 5) and/or a second conductive pattern 1215.

The FPCB antenna 1200 may include the first conductive pattern 1210 and/or the second conductive pattern 1215. The FPCB antenna 1200 may be located on a nonconductive member (e.g., the nonconductive member 530 of FIG. 5).

The FPCB antenna 1200 may be disposed on the nonconductive member such that the second conductive pattern 1215 is disposed between the first conductive pattern 1210 and the antenna module 502. As another example, the second conductive pattern 1215 may be disposed on the nonconductive member to at least partially overlap the FPCB antenna 1200 between the first conductive pattern 1210 and the antenna module 502 when viewed in the +Z axis direction. The first conductive pattern 1210 may extend in the fourth direction (the +X axis direction) along the second conductive pattern 1215. For example, the second conductive pattern 1215 may decrease a radiation characteristic deviation of the first conductive pattern 1210 or the antenna module 502 even when an interval between the first conductive pattern 1210 and the antenna module 502 is changed.

The first conductive pattern 1210 may change at least a portion of the radiation pattern of a first signal belonging to the first frequency band of the antenna module 502.

When the FPCB antenna 1200 is disposed on the nonconductive member, the interval between the first conductive pattern 1210 and the antenna module 502 may be changed. The second conductive pattern 1215 may help maintain the interval between the first conductive pattern 1210 and the antenna module 502. The second conductive pattern 1215 may decrease a radiation characteristic deviation of the first conductive pattern 1210 due to a mounting error of the antenna module 502.

FIG. 12B is a view of the FPCB antenna 1200 of an electronic device (e.g., the electronic device 101 of FIG. 1) according to an embodiment.

The FPCB antenna 1200 may include a first conductive pattern 1220, the second conductive pattern 1215, and a dummy pattern 1230.

The first conductive pattern 1220 may extend in the +X axis direction along the second conductive pattern 1215 by a first length L1. The first conductive pattern 1220 may be electrically connected to a wireless communication circuit (e.g., the wireless communication module 192 of FIG. 1) to radiate a signal of the second frequency band. For example, the first length L1 may be set according to the second frequency band that is radiated by the first conductive pattern 1220. For example, when the first conductive pattern 1220 radiates a 5G Sub-6 frequency band, the first length L1 may be set to about 12 mm to about 20 mm.

The dummy pattern 1230 may include the FPCB antenna 1200. The dummy pattern 1230 may be disposed in the +X axis direction that is a direction, in which the first conductive pattern 1220 extends. The dummy pattern 1230 may be disposed to be spaced apart from the first conductive pattern 1220.

The dummy pattern 1230 may be in a ground state and/or a floating state. The dummy pattern 1230 may influence at least a portion of a radiation pattern of a first signal belonging to the first frequency band. For example, when the first frequency band is a 5G mmWave band, the dummy pattern 1230 may reflect the first signal that travels from the second conductive pattern 1215 in the second direction (the +Z axis direction), in the third direction (the +Y axis direction).

The dummy pattern 1230 may be disposed when a length of the first conductive pattern 1210 according to the second frequency band is smaller than a length of an antenna array included in the antenna module 502. The dummy pattern 1230 may enhance a radiation performance of the antenna module (e.g., the antenna module 502 of FIG. 5). In an embodiment, the dummy pattern 1230 may adjust a resonance frequency of the first conductive pattern 1220. The dummy pattern 1230 may maintain a radiation direction of the first conductive pattern 1220 in a modified form.

FIG. 12C is a view of the FPCB antenna 1200 of the electronic device (e.g., the electronic device 101 of FIG. 1) according to an embodiment.

In an embodiment, the FPCB antenna 1200 may include a first conductive pattern 1240, the second conductive pattern 1215, and/or a plurality of dummy patterns 1250 and 1260.

In an embodiment, the first conductive pattern 1240 may extend in the +X axis direction along the second conductive pattern 1215 by a second length L2. For example, the second length L2 may be set according to the second frequency band that is radiated by the first conductive pattern 1240.

In an embodiment, the plurality of dummy patterns 1250 and 1260 may be disposed in the FPCB antenna 1200. The plurality of dummy patterns 1250 and 1260 may be disposed to be spaced apart from each other. The dummy patterns 1250 and 1260 may be disposed in parallel to each other in the +X axis direction that is the direction, in which the first conductive pattern 1240 extends. The plurality of dummy patterns 1250 and 1260 may be disposed to be spaced apart from the first conductive pattern 1240.

In an embodiment, the plurality of dummy patterns 1250 and 1260 may be in a state, in which they are connected to the ground, and/or a floating state. The plurality of dummy patterns 1250 and 1260 may change at least a portion of the radiation pattern of the first signal belonging to the first frequency band of the antenna module 502. For example, when the first frequency band is a 5G mmWave band, the plurality of dummy patterns 1250 and 1260 may reflect the first signal that travels from the second conductive pattern 1215 in the second direction (the +Z axis direction), in the third direction (the +Y axis direction). According to an embodiment, the plurality of dummy patterns 1250 and 1260 may be two or more dummy patterns.

Figure 13:
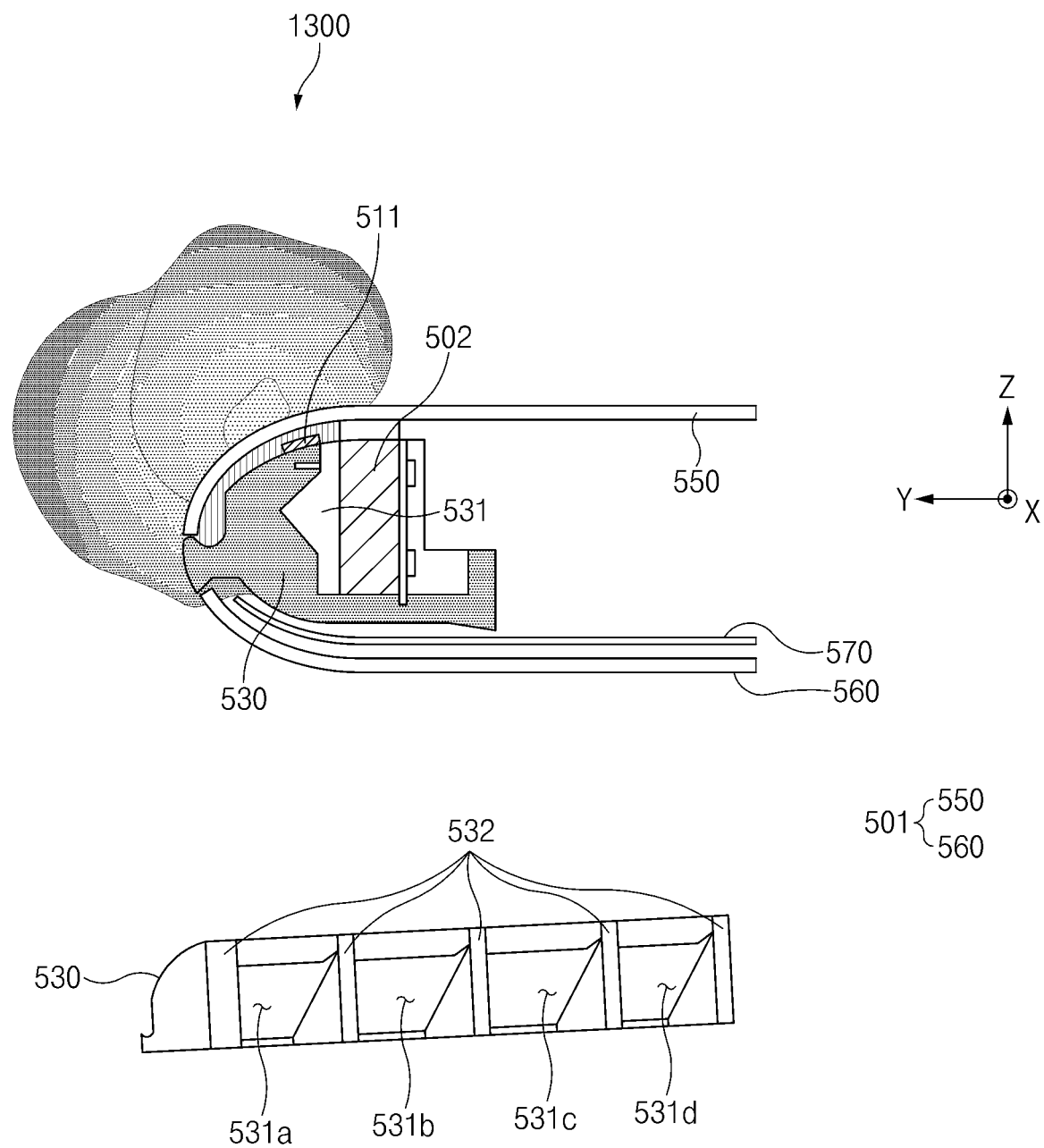
FIG. 13 is a view illustrating a nonconductive member and an opening of an electronic device according to an embodiment.

FIG. 13 is a view 1300 illustrating the nonconductive member 530 of the electronic device (e.g., the electronic device 101 of FIG. 1) according to an embodiment. The nonconductive member changes the radiation direction of the signal.

The electronic device 101 may include the housing 501 including the front plate 560 and the rear plate 550, the display 570, the nonconductive member 530, and/or the antenna module 502. The display 570 may be disposed in the second direction (the +Z axis direction) of the front plate 550.

A central portion of the front plate 550 may be formed flat, and a peripheral portion thereof may be formed in a curved form, curving towards the rear plate 550.

A central part of the rear plate 560 may be formed flat, and a periphery thereof may be formed in a deflected form, curving towards the front plate 550.

At least a portion of the nonconductive member 530 may support the antenna module 502. The conductive pattern 511 may be disposed in the second direction (the +Z axis direction) of the nonconductive member 530.

At least one space 531 may be formed in the nonconductive member 530. For example, a plurality of empty spaces 531a, 531b, 531c, and 531d may be formed in the nonconductive member 530. A plurality of shielding walls 532 may be formed to isolate the plurality of empty spaces 531a, 531b, 531c, and 531d. The plurality of shielding walls 532 may be disposed not to overlap antenna elements included in the antenna module 502.

Figure 14:
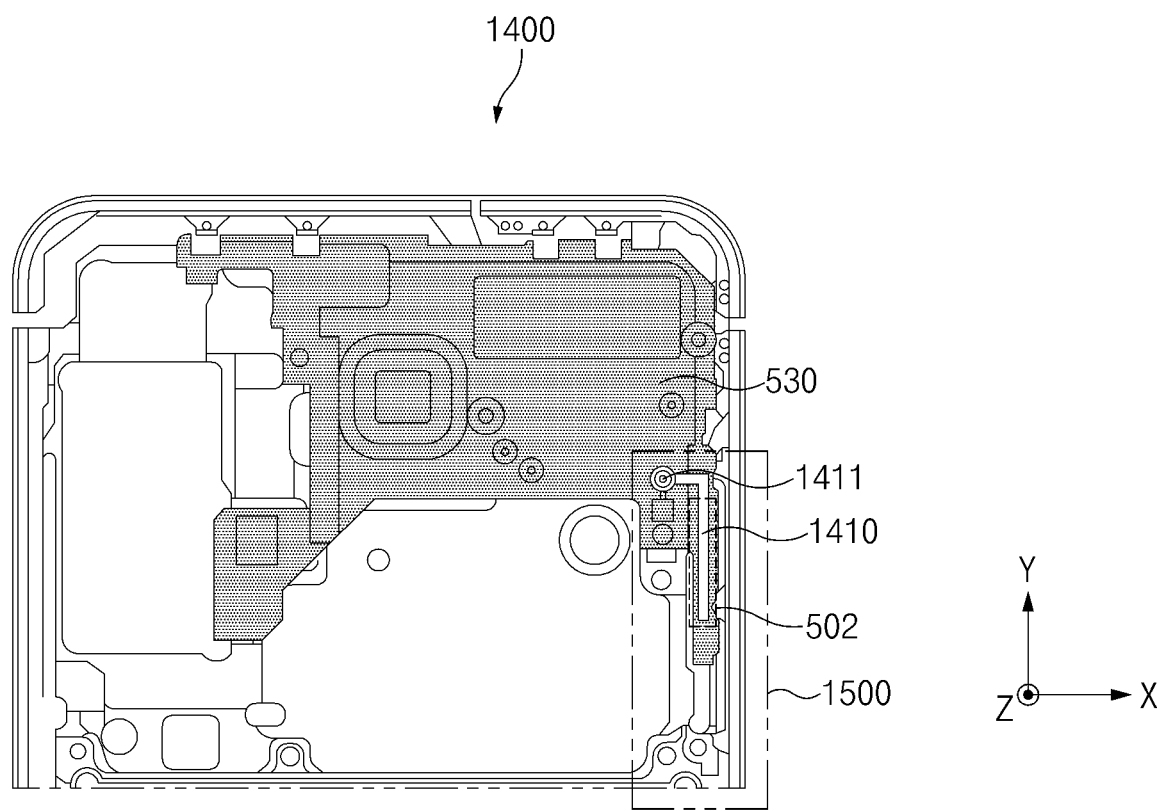
FIG. 14 is a view illustrating a nonconductive member and a conductive pattern of an electronic device according to an embodiment.

FIG. 14 is a view 1400 illustrating the nonconductive member 530 and a conductive pattern 1410 of the electronic device (e.g., the electronic device 101 of FIG. 1) according to an embodiment.

The antenna module 502 may be disposed on the PCB (e.g., the PCB 440 of FIG. 4). For example, the antenna module 502 may be disposed to form a beam between the nonconductive member 530 and the display in the X axis direction.

The nonconductive member 530 may be formed by expanding a carrier. When the nonconductive member 530 is formed by expanding the carrier, the nonconductive member 530 may be disposed to overlap at least a portion of the PCB 440 in the first direction (the −Z axis direction) and/or the second direction (the +Z axis direction).

The conductive pattern 1410 may be fed with electric power through a via structure 1411 disposed on a connection member (e.g., a connector 1620 of FIG. 16) and/or a nonconductive member (e.g., the second support member 460 of FIG. 4) disposed in the PCB 440. The connection member 1620, for example, may include a C-clip. The nonconductive member 530, for example, may be a rear cover. The conductive pattern 1410 may be disposed to extend from the via structure 1411 that protrudes from the nonconductive member 530 in the second direction (e.g., the +Z axis direction) and then extend in the fourth direction (e.g., the −Y axis direction). For example, the conductive pattern 1410 may be implemented through an FPCB or an LDS.

Figure 15:
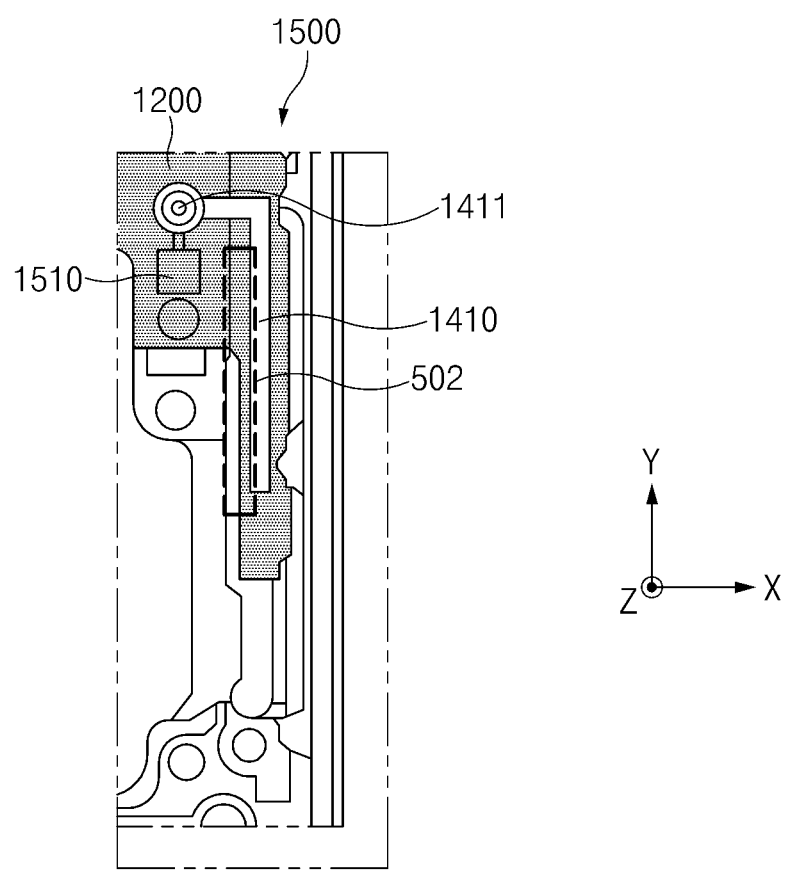
FIG. 15 is a view illustrating a conductive pattern of an electronic device according to an embodiment.

FIG. 15 is a view 1500 illustrating the conductive pattern 1410 of the electronic device (e.g., the electronic device 101 of FIG. 1) according to an embodiment.

In an embodiment, the FPCB antenna 1200 may be disposed on a nonconductive member (e.g., the nonconductive member 530 of FIG. 14). The nonconductive member 530 may be connected to the connector (e.g., a C-clip) of the PCB (e.g., the PCB 440 of FIG. 4).

In an embodiment, the conductive pattern 1410 may be included in the FPCB antenna 1200. The conductive pattern 1410 may be disposed on the nonconductive member 530. The conductive pattern 1410 may be disposed on the antenna module in the Z axis direction. The conductive pattern 1410, for example, may be implemented through an FPCB or an LDS.

In an embodiment, the nonconductive member 530 may include the via structure 1411. The via structure 1411 may connect the FPCB antenna 1200 and the PCB 440. For example, when the conductive pattern 1410 is disposed in the nonconductive member 530 in a form of an FPCB and/or an LDS, the via structure 1411 may connect the PCB 440 and the conductive pattern 1410.

In an embodiment, a terminal 1510 may be disposed in the FPCB antenna 1200. The terminal 1510 may be connected to the PCB 440 through a connection member, such as a hole on the nonconductive member 530. For example, the terminal 1510 may be connected to the PCB 440 through the connection member, such as a C-clip.

Figure 16:
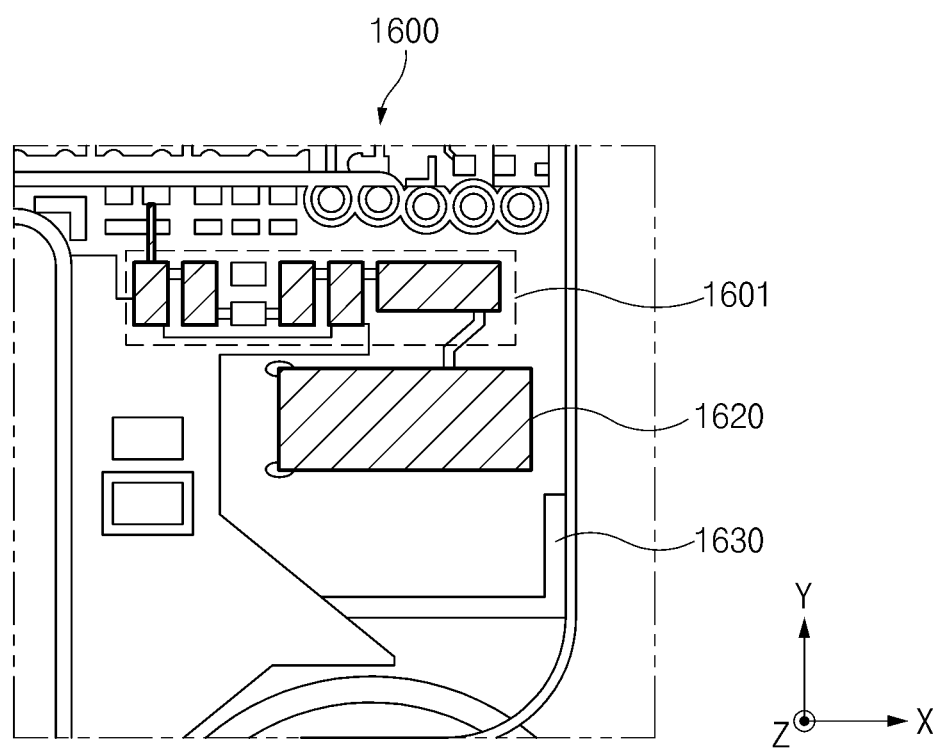
FIG. 16 is a view illustrating a matching circuit part of an electronic device according to an embodiment.

FIG. 16 is a view 1600 of a matching circuit part 1601 of the PCB 440 of the electronic device (e.g., the electronic device 101 of FIG. 1) according to an embodiment.

In an embodiment, the matching circuit part 1601 of the PCB 440 may be connected to a feeder. The matching circuit part 1601 may include at least one passive element that constitutes a matching circuit. The matching circuit part 1601 may connect the passive elements in series and/or in parallel to adjust a frequency of a signal that is transmitted and received by the electronic device 101. The matching circuit part 1601 may include at least one capacitor and/or at least one inductor. For example, the passive elements may adjust a frequency band of a signal that is fed by the matching circuit part 1601.

In an embodiment, the connector 1620 may connect the matching circuit part 1601 to the FPCB antenna (e.g., the FPCB antenna 1200 of FIG. 15). For example, the connector 1620 may be a C-clip. A connection line 1630 may connect the matching circuit part 1601 to the ground.

Figure 17:
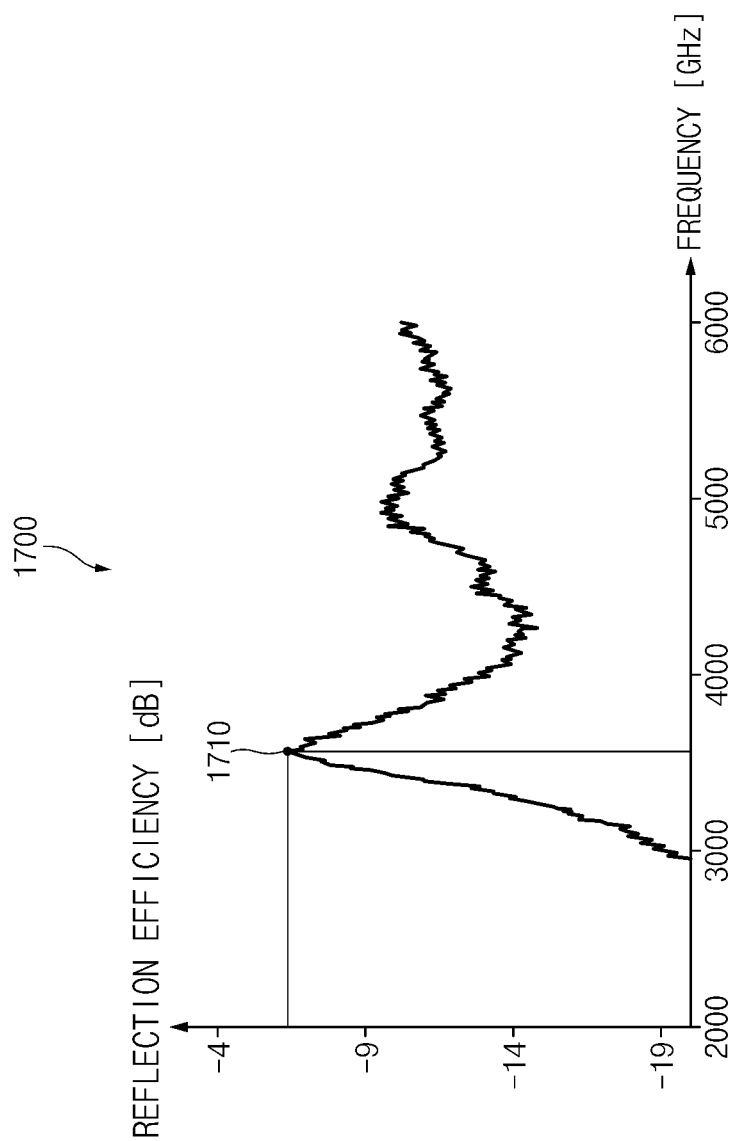
FIG. 17 is a graph illustrating a reflection efficiency of a second frequency band of an electronic device according to an embodiment.

FIG. 17 is a graph 1700 illustrating a reflection efficiency of a second frequency band of the electronic device (e.g., the electronic device 101 of FIG. 1) according to an embodiment.

In an embodiment, it may be identified that the electronic device 101, to which the conductive pattern (e.g., the conductive pattern 1410 of FIG. 14) and the matching circuit part (e.g., the matching circuit part 1601 of FIG. 16) of FIGS. 14 to 16 are applied, has a reflection efficiency of about −6.5 dB when the second frequency band is about 3.5 GHz. The electronic device 101 may form a resonance of about −6.5 dB at a frequency band of about 3.5 GHz. Furthermore, it may be identified in the graph 1700 that the reflection efficiency is maximum at a point 1710 and is at about 3.5 GHz and the reflection efficiency is increased at about 5 GHz. Referring to the graph 1700, it may be identified that the electronic device 101 may maintain a reflection efficiency of about −14 dB at a 3.5 GHz or more. For example, the electronic device 101 may radiate a signal of a 5G Sub-6 frequency band including about 3.5 GHz and about 6 GHz.

Figure 18:
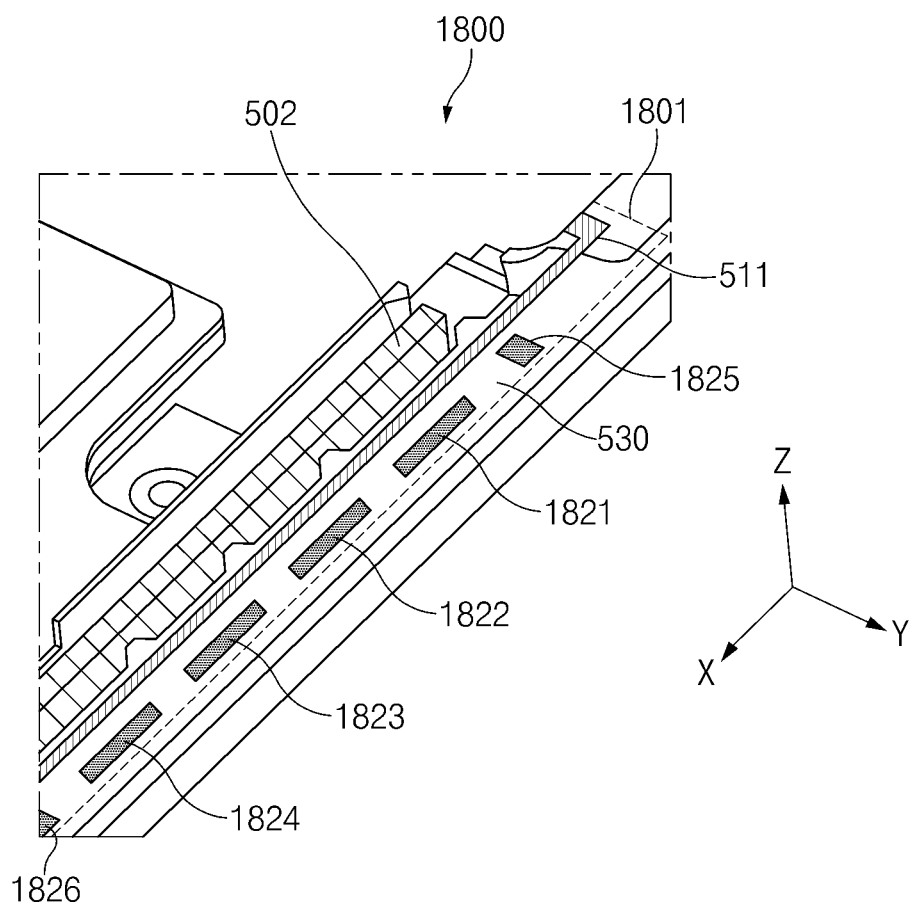
FIG. 18 is a view illustrating a nonconductive member, an FPCB antenna, a conductive pattern, and a direction pattern of an electronic device according to an embodiment.

FIG. 18 is a view 1800 illustrating the nonconductive member 530, an FPCB antenna 1801 (e.g., the FPCB antenna 1200 of FIGS. 12A to 12C), the conductive pattern 511, and direction patterns 1821, 1822, 1823, 1824, 1825, and 1826 of an electronic device (e.g., the electronic device 101 of FIG. 1).

In an embodiment, the conductive pattern 511 and the direction patterns 1821, 1822, 1823, 1824, 1825, and 1826 may be disposed in the FPCB antenna 1801. The FPCB antenna 1801 may be disposed on the nonconductive member 530. When viewed in from the Z axis direction, the conductive pattern 511 may be disposed to be closer to the side member (e.g., the side member 542 of FIG. 5) of the electronic device 101 in the +Y axis direction than to the antenna module 502. The direction patterns 1821, 1822, 1823, 1824, 1825, and 1826 may be operated as directors.

In an embodiment, the conductive pattern 511 may be operated as a Sub-6 frequency band antenna radiator.

In an embodiment, when viewed from the +Z axis direction, the direction patterns 1821, 1822, 1823, 1824, 1825, and 1826 may be disposed between the conductive pattern 511 and the side member (e.g., the side member 542 of FIG. 5) of the housing (e.g., the housing 501 of FIG. 5). The direction patterns 1821, 1822, 1823, 1824, 1825, and 1826 may be disposed to be spaced apart from the conductive pattern 511. The direction patterns 1821, 1822, 1823, 1824, 1825, and 1826 may be disposed to extend in parallel to the conductive pattern 511 in the +X axis direction.

In an embodiment, the direction patterns 1821, 1822, 1823, 1824, 1825, and 1826 may be arranged to correspond to the directions of the antenna elements on the antenna module 502. The direction patterns 1821, 1822, 1823, 1824, 1825, and 1826 may adjust the radiation directions of the frequency bands that are radiated by the antenna elements on the antenna module 502. For example, the direction patterns 1821, 1822, 1823, 1824, 1825, and 1826 may increase a signal that is radiated by the antenna module 502 in the X axis and/or Y axis direction.

Figure 19:
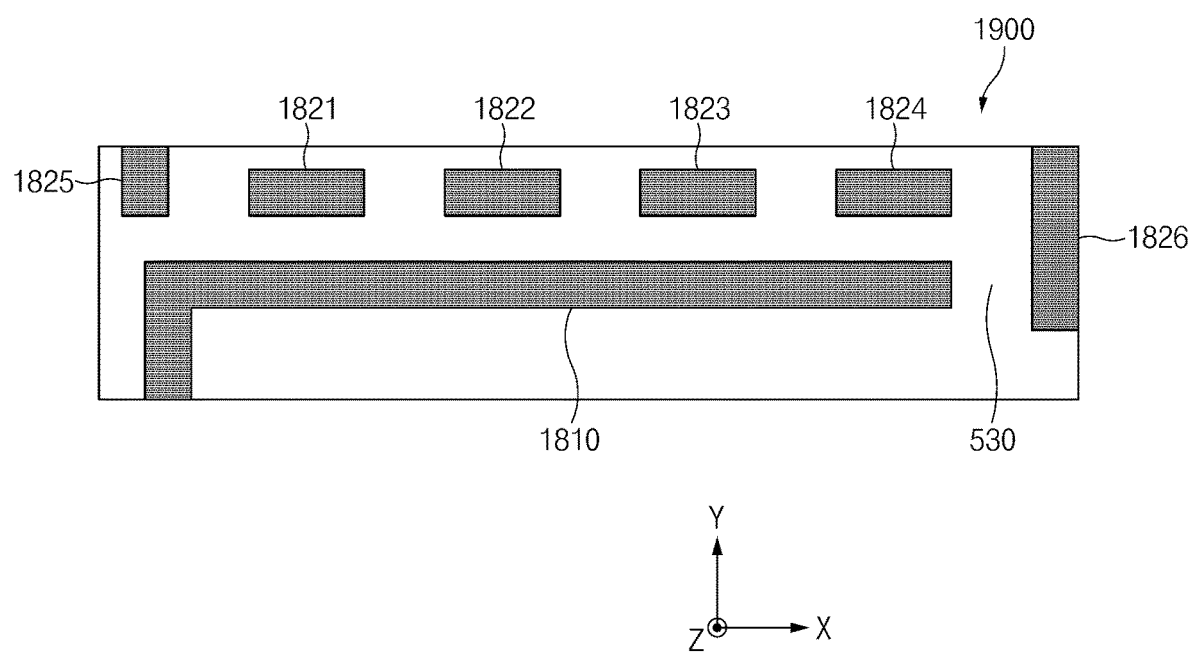
FIG. 19 is a view illustrating a nonconductive member, a conductive pattern, and a direction pattern of an electronic device according to an embodiment.

FIG. 19 is a view 1900 illustrating the nonconductive member 530, a conductive pattern 1810, and the direction patterns 1821, 1822, 1823, 1824, 1825, and 1826 of the electronic device (e.g., the electronic device 101 of FIG. 1) according to an embodiment.

In an embodiment, the direction patterns 1821, 1822, 1823, 1824, 1825, and 1826 may be disposed on the nonconductive member 530. For example, the direction patterns 1821, 1822, 1823, 1824, 1825, and 1826 may be disposed in parallel to each other while being spaced apart from each other. In an embodiment, the direction patterns 1821, 1822, 1823, 1824, 1825, and 1826 may include first direction patterns 1821, 1822, 1823, and 1824 and/or second direction patterns 1825 and 1826.

In an embodiment, the first direction patterns 1821, 1822, 1823, and 1824 may perform a role of direction patterns of the antenna elements included in the antenna module 502. In an embodiment, the first direction patterns 1821, 1822, 1823, and 1824 may be in a floating state. The first direction patterns 1821, 1822, 1823, and 1824 may be disposed while having an interval with the conductive pattern 1810 (e.g., the conductive pattern 511 of FIG. 18). In an embodiment, the first direction patterns 1821, 1822, 1823, and 1824 may be determined based on the number of the antenna elements included in the antenna module 502.

In an embodiment, the second direction patterns 1825 and 1826 may be reflector patterns that function as reflectors that reflect a beam radiated laterally from being spread out. The second direction patterns 1825 and 1826 may enhance a radiation performance in a direction that is oblique to a lateral side of the electronic device 101. The second direction patterns 1825 and 1826 may be in a state, in which they are connected to the ground, and/or a floating state. When the second direction patterns 1825 and 1826 are in a state, in which they are connected to the ground, the second direction patterns 1825 and 1826 may be connected to the ground layer of the PCB (e.g., the PCB 440 of FIG. 4) through a separate connection terminal (e.g., C-clip).

Figure 20:
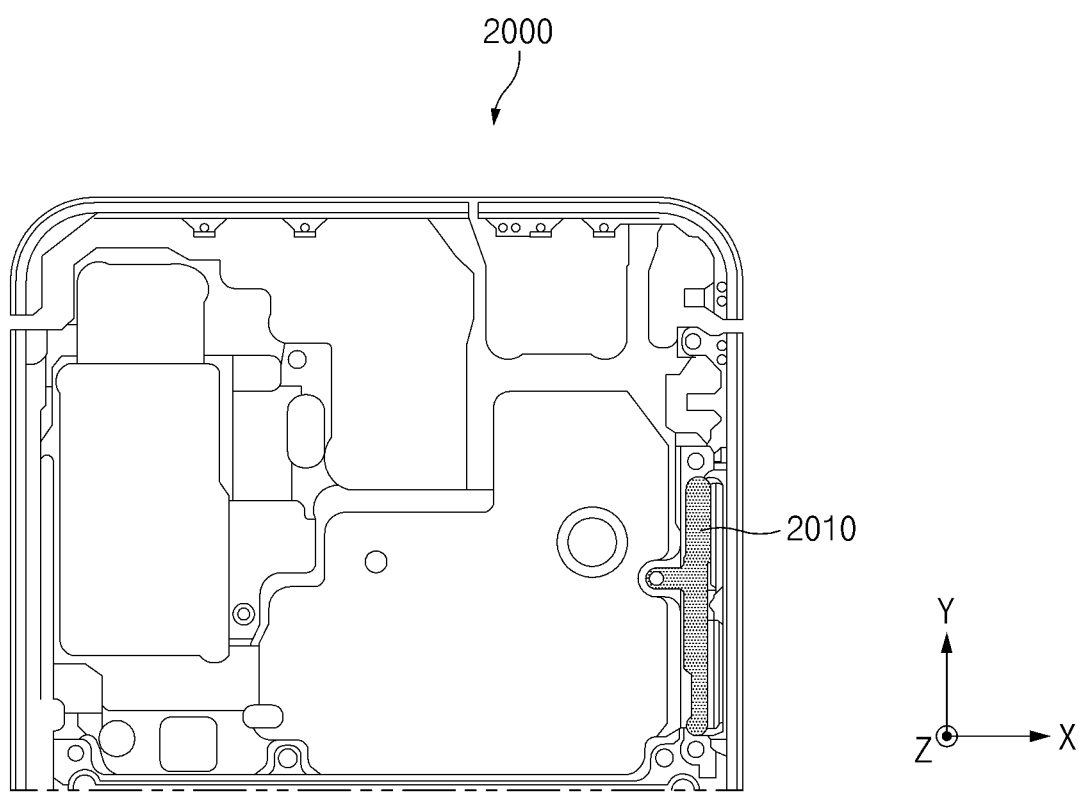
FIG. 20 is a view illustrating an installation part of an electronic device according to an embodiment.

FIG. 20 is a view 2000 illustrating an installation part 2010 of the electronic device (e.g., the electronic device 101 of FIG. 1) according to an embodiment.

In an embodiment, the installation part 2010 (e.g., the nonconductive path 521 of FIG. 5) for disposing the antenna module 502 may be formed in the conductive member (e.g., the conductive member 541 of FIG. 4) of the electronic device 101. The installation part 2010 may be disposed to be adjacent to the side member (e.g., the side member 542 of FIG. 5).

In an embodiment, the installation part 2010 may be an area, in which the antenna module (e.g., the antenna module 502 of FIG. 5) is mounted. The installation part 2010 may be filled with a nonconductive material for fixing the antenna module 502. The installation part 2010 may be configured to radiate the first signal of the first frequency band of the antenna module 502 in the first direction (e.g., the X axis direction). The installation part 2010 may enhance a radiation performance of the first signal to the front side of the electronic device 101.

Figure 21:
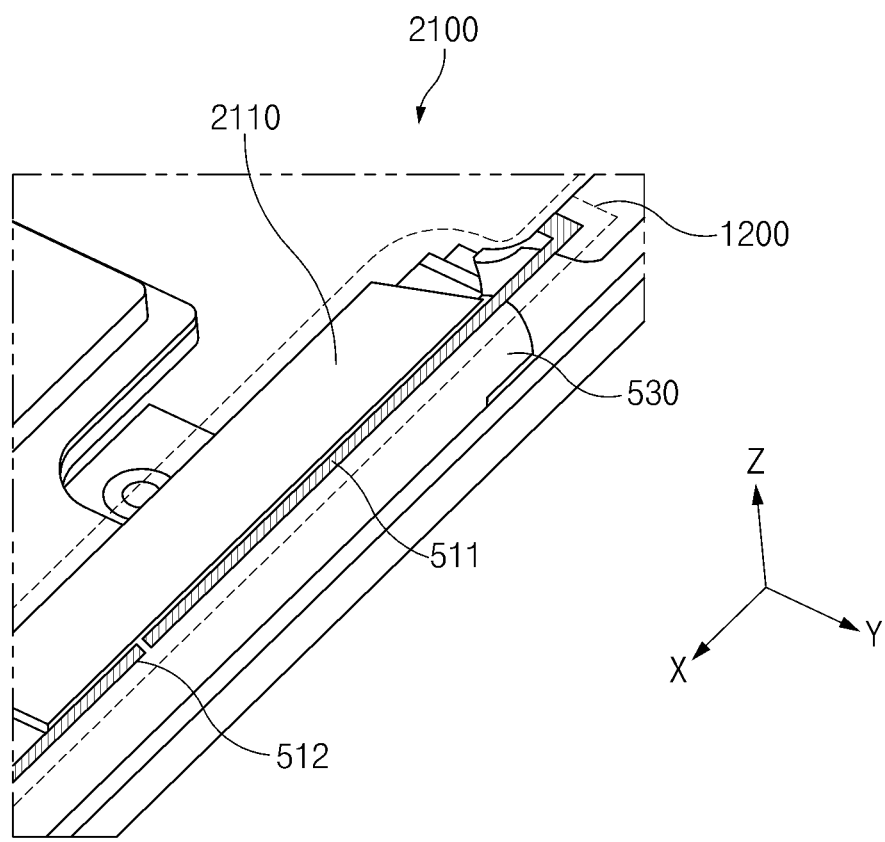
FIG. 21 is a view illustrating a nonconductive member, a conductive pattern, and a shield sheet of an electronic device according to an embodiment.

FIG. 21 is a view 2100 illustrating the nonconductive member 530, the FPCB antenna 1200, and a shield sheet 2110 of the electronic device (e.g., the electronic device 101 of FIG. 1) according to an embodiment.

In an embodiment, the shield sheet 2110 may be disposed in the second direction (the +Z axis direction) from the nonconductive member 530. In an embodiment, the shield sheet 2110 may be disposed to cover at least a portion of the FPCB antenna 1200. When viewed from the +Z axis direction, the shield sheet 2110 may be disposed to cover the antenna module (e.g., the antenna module 502 of FIG. 5). The shield sheet 2110 may be disposed to cover at least a portion of the nonconductive member 530.

In an embodiment, the shield sheet 2110 may alleviate a leakage phenomenon, in which the first signal of the first frequency band is leaked out toward one surface (e.g., the rear plate 550 or the front plate 560 of FIG. 5) of the electronic device. For example, the shield sheet 2110 may cause at least a portion of the first signal of the first frequency band, which is radiated by the antenna module 502 that faces the second direction (e.g., the +Z axis direction) to face a lateral direction (e.g., the +Y axis direction) of the electronic device 101. The shield sheet 2110 may be in a state, in which it is connected to the ground, and/or a floating state.

Figure 22:
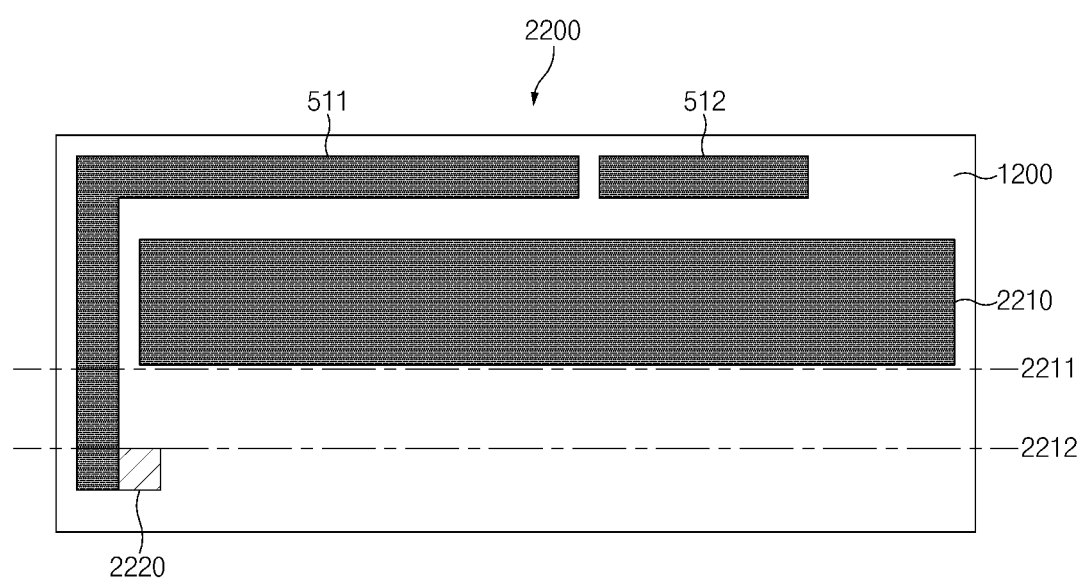
FIG. 22 is a view illustrating a nonconductive member, a conductive pattern, and a shield sheet of an electronic device according to an embodiment.

FIG. 22 is a view illustrating the nonconductive member 530, the conductive patterns 511 and 512, and a shield sheet 2210 of the electronic device (e.g., the electronic device 101 of FIG. 1) according to an embodiment.

In an embodiment, the FPCB antenna 1200 may include a first bending line 2211 and/or a second bending line 2212. The FPCB antenna 1200 may be bent twice due to the first bending line 2211 and the second bending line 2212 and may be bent to, among surfaces of the nonconductive member (e.g., the nonconductive member 530 of FIG. 5), a rear surface thereof that is a surface that faces the rear plate (e.g., the rear plate 311 of FIG. 3B). For example, the remaining portions of the FPCB antenna 1200, other than the portion, at which the shield sheet 2210 is disposed, may be bent to the rear surface of the nonconductive member 530. A portion that is bent to the rear side of the FPCB antenna 1200 may be connected to a feeder 2220.

In an embodiment, the shield sheet 2210 may be disposed between the conductive patterns 511 and 512 and the feeder 2220 (e.g., the feeder of the PCB 440 including the matching circuit part 1601 of FIG. 16). The shield sheet 2210 may be located on the antenna module (e.g., the antenna module 502 of FIG. 5). The shield sheet 2210 may shield a leakage signal that is leaked out from the antenna module 502.

Figure 23:
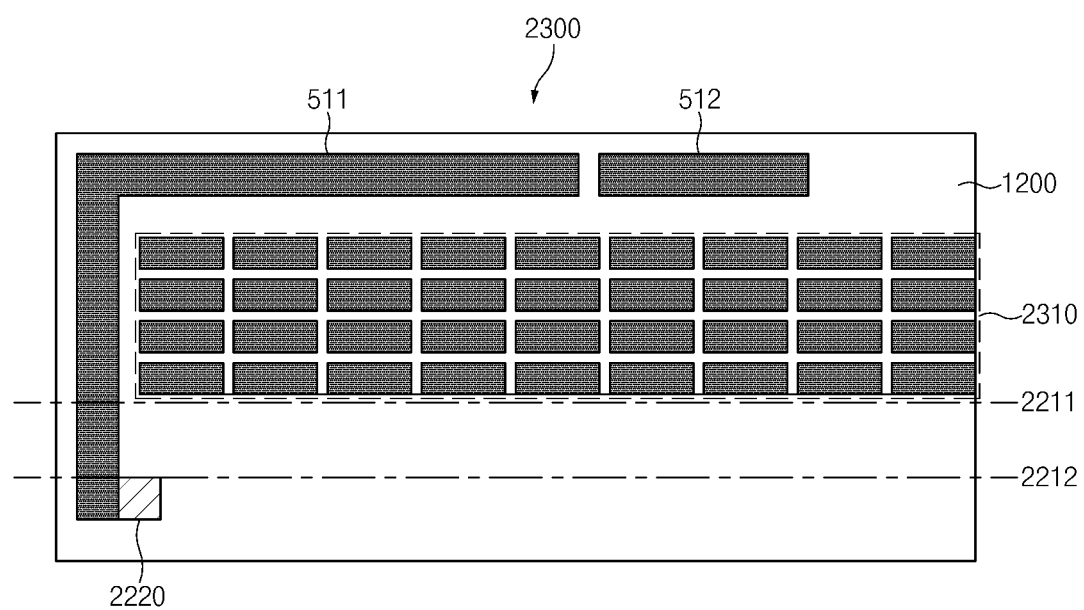
FIG. 23 is a view illustrating a nonconductive member, a conductive pattern, and a shield pattern of an electronic device according to an embodiment.

FIG. 23 is a view illustrating the nonconductive member 530, the conductive patterns 511 and 512, and shield patterns 2310 of the electronic device (e.g., the electronic device 101 of FIG. 1) according to an embodiment.

In an embodiment, the shield patterns 2310 may be disposed between the conductive patterns 511 and 512 and the feeder 2220 (e.g., the feeder of the PCB 440 including the matching circuit part 1601 of FIG. 16). In an embodiment, the shield patterns 2310 may be disposed in parallel to each other. As another example, the plurality of patterns that constitute the shield patterns 2310 may be adjacent to each other, or some thereof may be connected to each other. The shield patterns 2310 may be one or more layers. When the shield patterns 2310 are viewed from a top, the shield patterns 2310 may be disposed to at least partially overlap the antenna module 502. The shield patterns 2310 may shield a leakage signal that is leaked out from the antenna module 502. The shield patterns 2310 may be in a state, in which it is connected to the ground, and/or a floating state.

Figure 24:
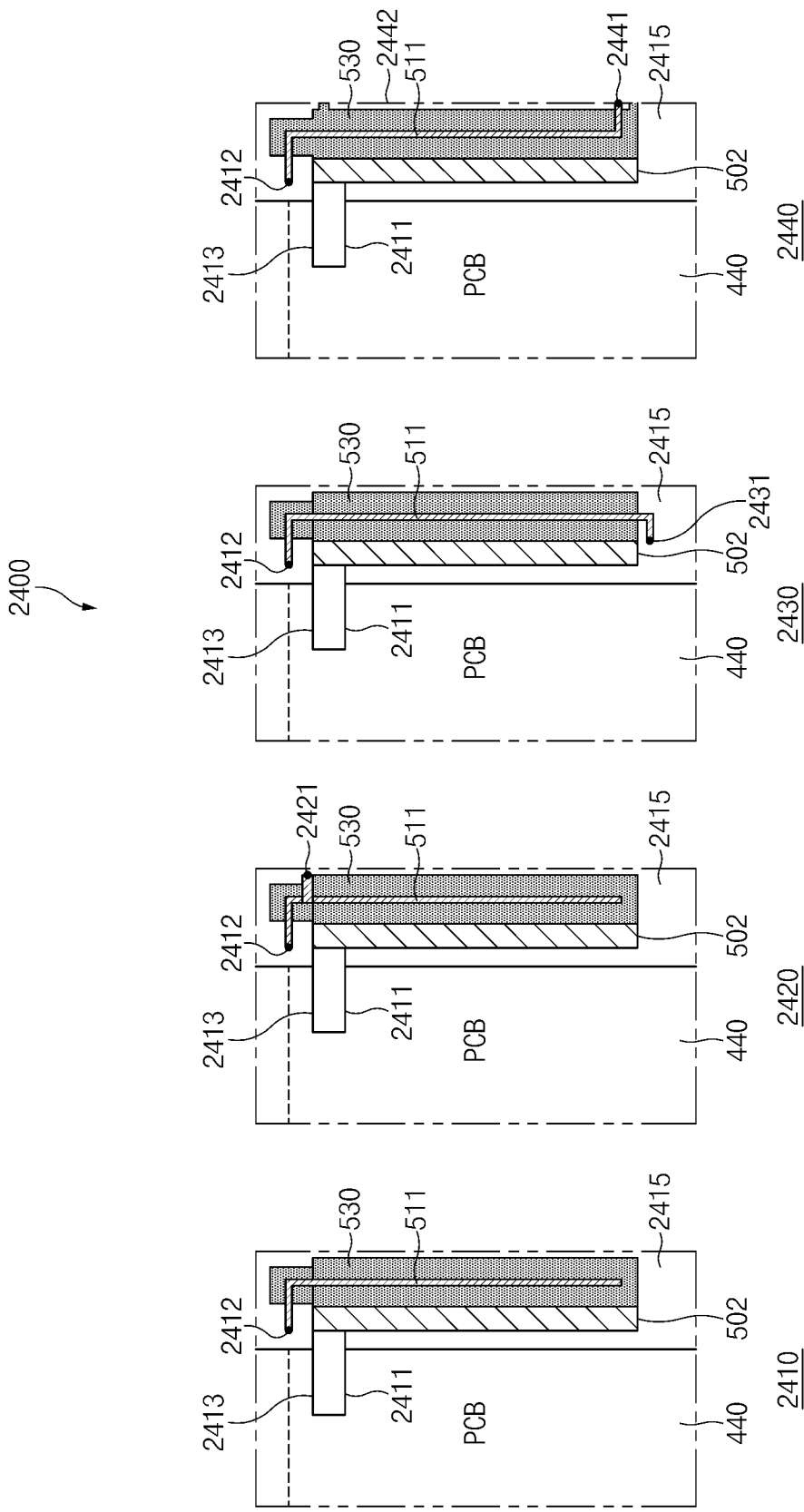
FIG. 24 is a view illustrating structures of antennas according to certain embodiments.

FIG. 24 is a view 2400 illustrating a structure of antennas 2410, 2420, 2430, and 2440 according to certain embodiments.

In an embodiment, when only a feeder 2412 is provided in the conductive pattern 511, a structure for a monopole antenna 2410 may be implemented. The nonconductive member 530 may be disposed in a side member 2415 (e.g., the side member 542 of FIG. 5). The conductive pattern 511 may be disposed in the nonconductive member 530. The antenna module 502 and the PCB 440 may be connected to each other through a connector 2411. The conductive pattern 511 may be fed with electric power through the feeder 2412.

In an embodiment, when the feeder 2412 and a ground part 2421 are provided in the conductive pattern 511, a structure for an inverted-F antenna 2420 may be implemented. The conductive pattern 511 may be fed with electric power through the feeder 2412, and may be connected to the ground through the ground part 2421. The ground part 2421 may be connected to the ground layer of the PCB 440 and/or the conductive pattern in a state, in which it is connected to a separate ground.

In an embodiment, when the feeder 2412 and a ground part 2431 are provided and the conductive pattern 511 is provided between the feeder 2412 and the ground part 2431, a structure for the antenna 2430 having a form of a loop may be implemented. The conductive pattern 511 may be fed with electric power through the feeder 2412, and may be connected to the ground through the ground part 2431.

In an embodiment, the conductive pattern 511 may be fed with electric power through the feeder 2412, and may be connected to a metal frame (e.g., a conductive portion of the side member 542 of the housing 501 of FIG. 5) through a connector 2441. In this case, a structure for the divided ground antenna 2440 may be implemented.

In an embodiment, at least a portion of the conductive pattern 511 may be divided. However, the disclosure is not limited thereto, and the conducive pattern 511 may be integrally formed and may be connected to a metal frame 542 through the connector 2441. In an embodiment, the conductive pattern 511 may have various forms of ground parts. For example, the conductive pattern 511 may have the ground part 2421 of a structure for the inverted-F antenna 2420. As another example, the conductive pattern 511 may have the ground part 2431 of a structure for the loop antenna 2430.

An electronic device (e.g., the electronic device 101 of FIG. 1) according to an embodiment may include a housing (e.g., the housing 310 of FIG. 3A) including a front plate (e.g., the front plate 560 of FIG. 5), a rear plate (e.g., the rear plate 550 of FIG. 5), and a side member (e.g., the side member 542 of FIG. 5) surrounding a space (e.g., the space 531 of FIG. 5) between the first plate 560 and the second plate 550 including a conductive member (e.g., the conductive member 541 of FIG. 5), an antenna module (e.g., the antenna module 502 of FIG. 3) disposed in the space 531, and that transmits and/or receives a first signal belonging to a first frequency band by using at least one antenna element, a nonconductive member (e.g., the nonconductive member 530 of FIG. 3) disposed to face at least one surface of the antenna module 502, and a conductive pattern (e.g., the conductive pattern 511 of FIG. 5) being closer to the rear plate 550 than to front plate and disposed between the nonconductive member 530 and the rear plate 560, and the conductive pattern may be configured to change a radiation direction of at least a portion of the first signal and transmit and receive a second signal belonging to a second frequency band processed by the wireless communication circuit.

In an embodiment, the nonconductive member 530 comprises an injection-molded product connected to the conductive member 541 and disposed in an area around the antenna module 502.

In an embodiment, the conductive pattern 511 may be disposed in a first area (e.g., the first area 510 of FIG. 5) that is deflected from a first surface of the front plate 560, toward a second face of the rear plate and extending seamlessly.

In an embodiment, the electronic device may include a nonconductive path (e.g., the nonconductive path 521 of FIG. 5) disposed between the front plate 560 and the side member 542.

In an embodiment, the conductive pattern may use a common ground with the antenna module.

In an embodiment, the front plate faces a first direction, and the nonconductive path 521 may be configured to radiate the first signal in the first direction.

In an embodiment, the conductive pattern 511 may form an FPCB antenna (e.g., the FPCB antenna 1200 of FIG. 12A) disposed on the conductive member 541, and the FPCB antenna 1200 may be connected to a ground layer of a printed circuit board (e.g., the PCB 440 of FIG. 4).

In an embodiment, the front plate faces a first direction, the rear plate faces a second direction, and the side member faces a third direction, and the conductive pattern increases a radiation performance in the first direction and the third direction of a radiation pattern of the first signal, and the first frequency band is 25 GHz to 100 GHz.

In an embodiment, the conductive pattern 511 may radiate the second signal, and the second frequency band may be 2 GHz to 6 GHz.

In an embodiment, the front plate faces a first direction, the rear plate faces a rear direction, and the nonconductive member 530 may overlaps at least a portion of the conductive pattern 511 in the first direction and the second direction.

In an embodiment, the conductive pattern 511 may have a first length of approximately 16 mm along the side member.

In an embodiment, wherein the front plate faces a first direction, wherein the rear plate faces a second direction, and wherein the at least one antenna element is disposed on a first surface facing the side member 542, the nonconductive member 530 may be disposed between the side member 542 and the antenna module 502, and the conductive pattern 511 may be disposed in the second direction from the nonconductive member 530.

In an embodiment, the electronic device may further include a dummy pattern (e.g., the dummy pattern 1230 of FIG. 12B) spaced apart from the conductive pattern 511 in a direction, in which the conductive pattern 511 extends on the nonconductive member 530.

In an embodiment, the electronic device may further include at least one direction pattern 1821, 1822, 1823, 1824, 1825, and 1826 disposed to be spaced apart from the conductive pattern 511 between the conductive pattern 511 and the side member 542.

In an embodiment, the electronic device may further include a shield sheet (e.g., the shield sheet 2110 of FIG. 21) disposed between the antenna module 502 and the rear plate 550.

In an embodiment, the electronic device further comprising a display disposed on the front plate.

In an embodiment, the nonconductive member comprises a convex area facing the antenna module.

In an embodiment, the rear plate comprises a bending area bending towards the front plate, and wherein the conductive pattern is above the bending area.

In an embodiment, the front plate comprises a bending area bending towards the rear plate.

In an embodiment, the first frequency band is 25 GHz to 100 GHz, and wherein the second frequency band is 2 GHz to 6 GHz.

An electronic device 101 according to certain embodiments may include a housing 310 including a front plate 560 facing a first direction, a rear plate 550 facing a second direction that is an opposite direction to the first direction, and a side member 542 surrounding a space 531 between the front plate 560 and the rear plate 550, and connecting one side of the front plate 560 ad one side of the rear plate 550. a nonconductive member 530 disposed in the space 531, an antenna module 502 disposed in the second direction of the nonconductive member 530, and a conductive pattern 511 disposed in an FPCB and/or an LDS to be at least partially adjacent to the antenna module 502, the conductive pattern 511 may change a first radiation pattern that is a radiation pattern of a first signal belonging to a first frequency band of about 25 GHz to about 100 GHz in a third direction that is perpendicular to the first direction and the second direction, and the conductive pattern 511 may be connected to the antenna module 502 through a feeder (e.g., the feeder 2220 of FIG. 22) to form a second radiation pattern that is a radiation pattern of a second signal belonging to a second frequency band of about 3.5 GHz to about 6 GHz.

In an embodiment, the conductive pattern 511 may reflect the first signal in a direction that faces the side member 542, and the direction, which the side member 542 faces, may include the third direction.

In an embodiment, the conductive pattern 511 may be disposed on the FPCB antenna 1200 disposed around the antenna module 502 on the nonconductive member 530.

In an embodiment, the feeder 2220 may connect the conductive pattern 511 and the printed circuit board 440, in which the antenna module 502 is disposed.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a housing including a front plate, a rear plate, and a side member surrounding a space between the front plate and the rear plate;
an antenna module disposed in the space, and configured to transmit and receive first signal belonging to a first frequency band using at least one antenna element;
a nonconductive member disposed to face at least one surface of the antenna module; and
a conductive pattern being closer to the rear plate than to front plate and disposed between the nonconductive member and the rear plate,
wherein the conductive pattern is configured to:
change a radiation direction of at least a portion of the first signal and transmit and receive a second signal belonging to a second frequency band.

2. The electronic device of claim 1, wherein the nonconductive member comprises an injection-molded product connected to the conductive member and disposed in an area around the antenna module.

3. The electronic device of claim 1, wherein the conductive pattern is disposed in a first area that is deflected from a first surface of the front plate, toward a second face of the rear plate, and extending seamlessly.

4. The electronic device of claim 1, comprising:
a nonconductive path disposed between the front plate and the side member.

5. The electronic device of claim 1, wherein the conductive pattern uses a common ground with the antenna module.

6. The electronic device of claim 4, wherein the front plate faces a first direction, and wherein the nonconductive path is configured to radiate the first signal in the first direction.

7. The electronic device of claim 1, wherein the conductive pattern forms a Flexible Printed Circuit Board (FPCB) antenna disposed on the nonconductive member, and the FPCB antenna is connected to a ground layer of a printed circuit board.

8. The electronic device of claim 1, wherein the front plate faces a first direction, wherein the rear plate faces a second direction, and wherein the side member faces a third direction, and wherein the conductive pattern increases a radiation performance in the first direction and the third direction of a radiation pattern of the first signal, and the first frequency band is 25 GHz to 100 GHz.

9. The electronic device of claim 1, wherein the conductive pattern radiates the second signal, and
wherein the second frequency band is 2 GHz to 6 GHz.

10. The electronic device of claim 1, wherein the front plate faces a first direction, wherein the rear plate faces a second direction, and wherein the nonconductive member overlaps at least a portion of the conductive pattern in the first direction or the second direction.

11. The electronic device of claim 1, wherein the conductive pattern has a length of approximately 16 mm along the side member.

12. The electronic device of claim 1, wherein the front plate faces a first direction, wherein the rear plate faces a second direction, and wherein the at least one antenna element is disposed on a first surface, facing the side member,
wherein the nonconductive member is disposed between the side member and the antenna module, and
wherein the conductive pattern is disposed in the second direction from the nonconductive member.

13. The electronic device of claim 1, further comprising:
a dummy pattern disposed to be spaced apart from the conductive pattern in a direction in which the conductive pattern extends on the nonconductive member.

14. The electronic device of claim 1, further comprising:
at least one direction pattern disposed to be spaced apart from the conductive pattern between the conductive pattern and the side member.

15. The electronic device of claim 1, further comprising:
a shield sheet disposed between the antenna module and the rear plate.

16. The electronic device of claim 1, further comprising a display disposed on the front plate.

17. The electronic device of claim 1, wherein the nonconductive member comprises a convex area facing the antenna module.

18. The electronic device of claim 1, wherein the rear plate comprises a bending area bending towards the front plate, and wherein the conductive pattern is above the bending area.

19. The electronic device of claim 18, wherein the front plate comprises a bending area bending towards the rear plate.

20. The electronic device of claim 1, wherein the first frequency band is 25 GHz to 100 GHz, and wherein the second frequency band is 2 GHz to 6 GHz.

* * * * *